United States Patent [19]
Hodge, Jr. et al.

[11] Patent Number: 6,069,801
[45] Date of Patent: May 30, 2000

[54] POWER FACTOR CORRECTION IN SWITCHING POWER CONVERSION

[75] Inventors: Stuart I. Hodge, Jr., Nashua, N.H.; Jason A. Young, Waltham, Mass.

[73] Assignee: VLT Corporation, San Antonio, Tex.

[21] Appl. No.: 09/116,625

[22] Filed: Jul. 16, 1998

[51] Int. Cl.⁷ .................................................. H02M 3/335
[52] U.S. Cl. ............................................................ 363/21
[58] Field of Search .................................. 363/16, 20, 21, 363/95, 97, 131

[56] References Cited

U.S. PATENT DOCUMENTS

| | | | |
|---|---|---|---|
| D. 328,057 | 7/1992 | Prager et al. | D13/110 |
| 4,415,959 | 11/1983 | Vinciarelli | 363/21 |
| 4,441,146 | 4/1984 | Vinciarelli | 363/20 |
| 4,648,020 | 3/1987 | Vinciarelli | 363/71 |
| 4,675,797 | 6/1987 | Vinciarelli | 363/21 |
| 4,890,210 | 12/1989 | Myers | 363/21 |
| 5,079,686 | 1/1992 | Vinciarelli | 363/15 |
| 5,088,016 | 2/1992 | Vinciarelli et al. | 363/15 |
| 5,235,502 | 8/1993 | Vinciarelli et al. | 363/20 |
| 5,289,361 | 2/1994 | Vinciarelli | 363/80 |
| 5,321,348 | 6/1994 | Vinciarelli et al. | 323/222 |
| 5,406,192 | 4/1995 | Vinciarelli | 323/222 |
| 5,572,417 | 11/1996 | Vinciarelli et al. | 363/89 |
| 5,610,804 | 3/1997 | Shimizu | 363/21 |
| 5,621,631 | 4/1997 | Vinciarelli et al. | 363/89 |
| 5,757,626 | 5/1998 | Jovanovic et al. | 363/21 |

OTHER PUBLICATIONS

Laszlo Huber et al., Single–Stage, Single–Switch, Isolated Power Supply Technique with Input–Current Shaping and Fast Output–Voltage Regulation for Universal Input–Voltage–Range Applications, pp. 1–9, Mar. 1994.

M. Daniele et al., A Single Stage Power Factor Corrected AC/DC Converter, pp. 256–262, Concordia University Quebec Canada, ©May 1996.

Richard Redl et al., A New Family of Single–Stage Isolated Power–Factor Correctors with Fast Regulation of the Output Voltage, pp. 1137–1144, ©Sep. 1994.

Richard Redl et al., Desigh Considerations for Single Isolated Power–Factor–Corrected Power Supplies with Fast Regulation of the Output Voltage, pp. 454–458 ©Dec. 1995.

Yimin Jiang et al., Single–Stage Single–Phase Parallel Power Factor Correction Scheme, pp. 1145–1151, Blacksburg, VA, ©Jul. 1994.

*Primary Examiner*—Matthew Nguyen
*Attorney, Agent, or Firm*—Fish & Richardson P.C.

[57] ABSTRACT

A power converter, for accepting power from a source and delivering power to a load, comprises conversion circuitry including a first side coupled to the source and a second side isolated from the first side and coupled to the load, energy storage circuitry, connected to the first side of the conversion circuitry, for storing energy at a voltage higher than the voltage of the source, and a switch arranged with respect to the conversion circuitry and energy storage circuitry to allow energy to be delivered from the source to the energy storage circuitry and a quantum of energy to be delivered to the second side of the conversion circuitry during a time that the switch is closed. Energy can be delivered to the energy storage circuitry and the quantum of energy delivered to the second side of the conversion circuitry during less than the entire time that the switch is closed. A method for use in converting power from a source to a load comprises closing a switch, receiving energy from the source during at least a portion of the time that the switch is closed for storage in a first circuit at a voltage higher than the voltage of the source, and transferring, during at least a portion of the time that the switch is closed, a quantum of energy stored in the first circuit to a second circuit that is coupled to the load and is isolated from the first circuit.

38 Claims, 28 Drawing Sheets

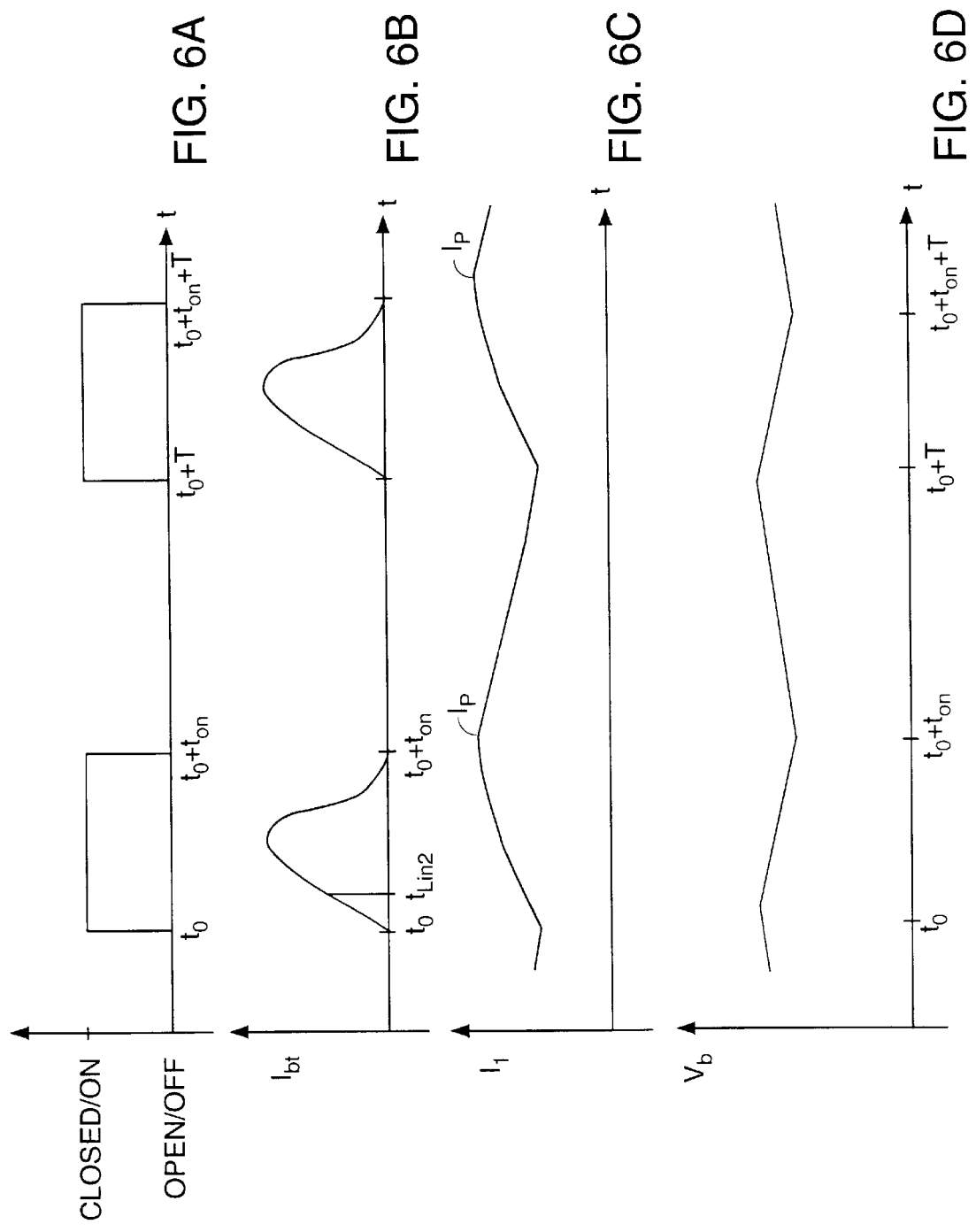

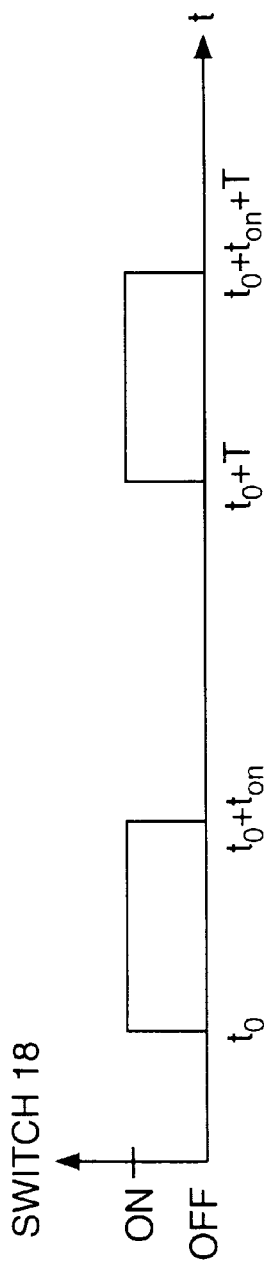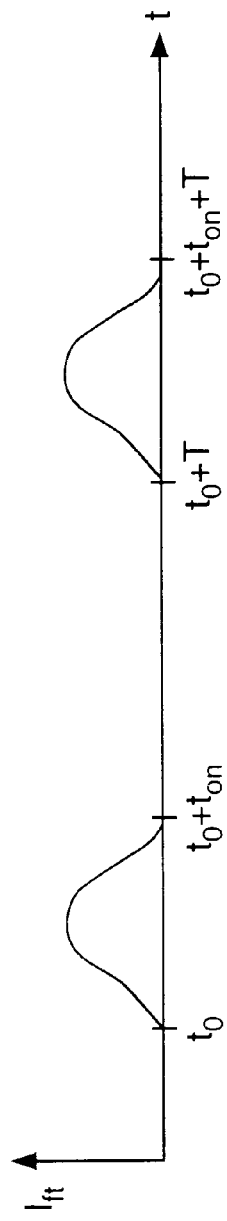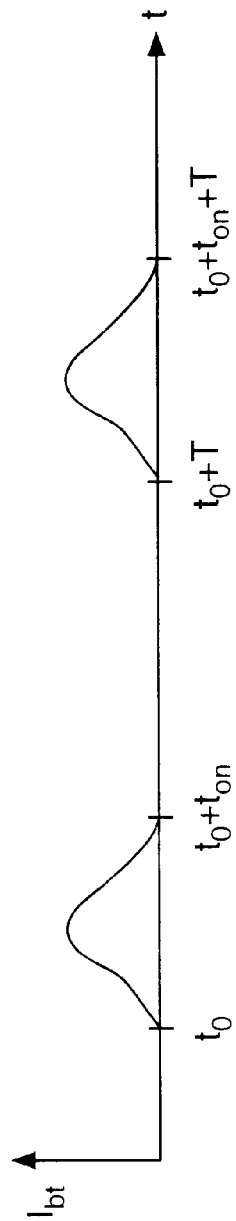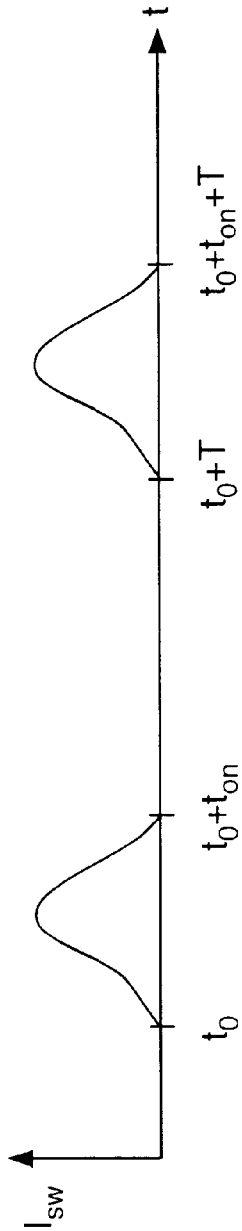

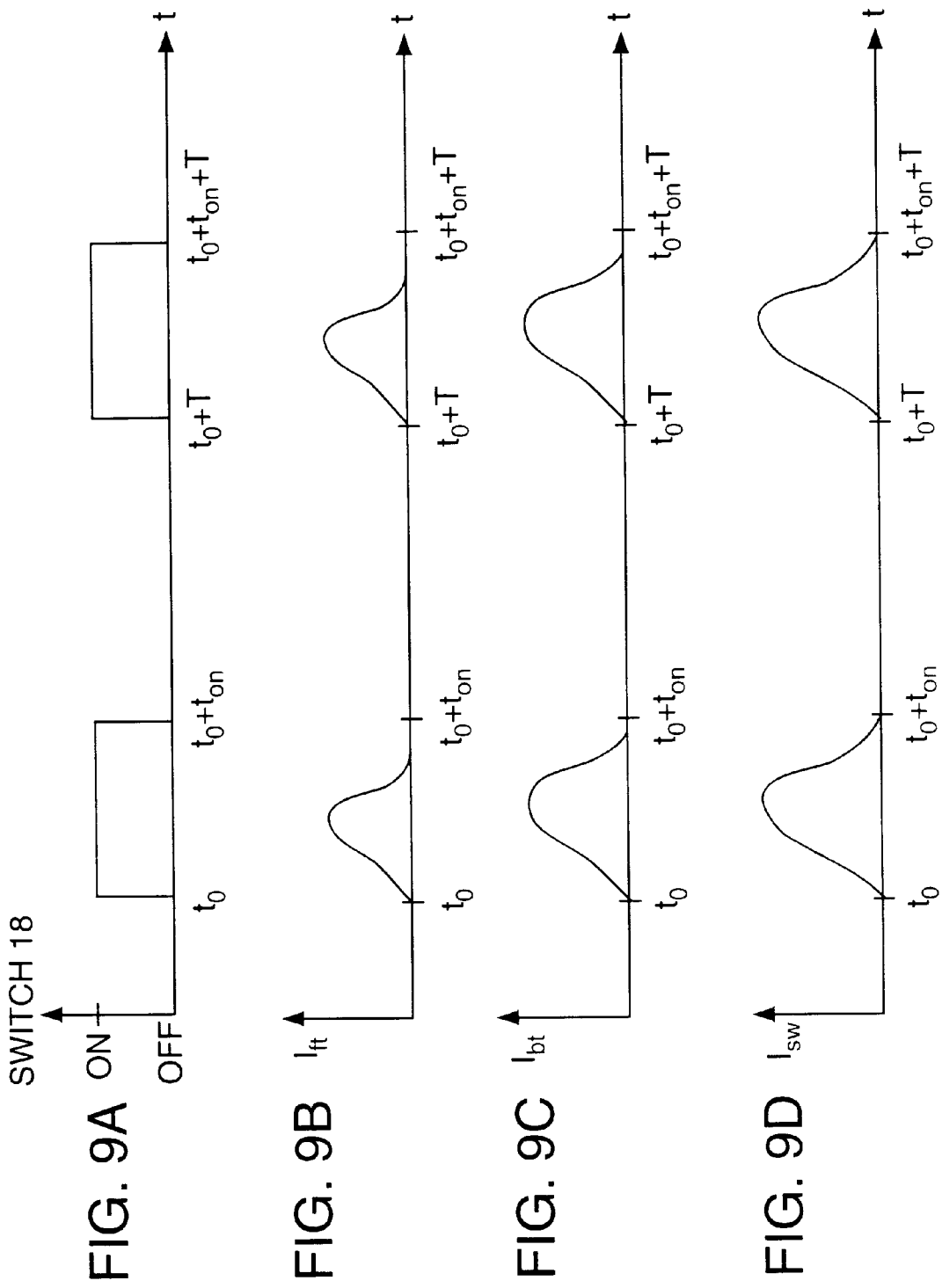

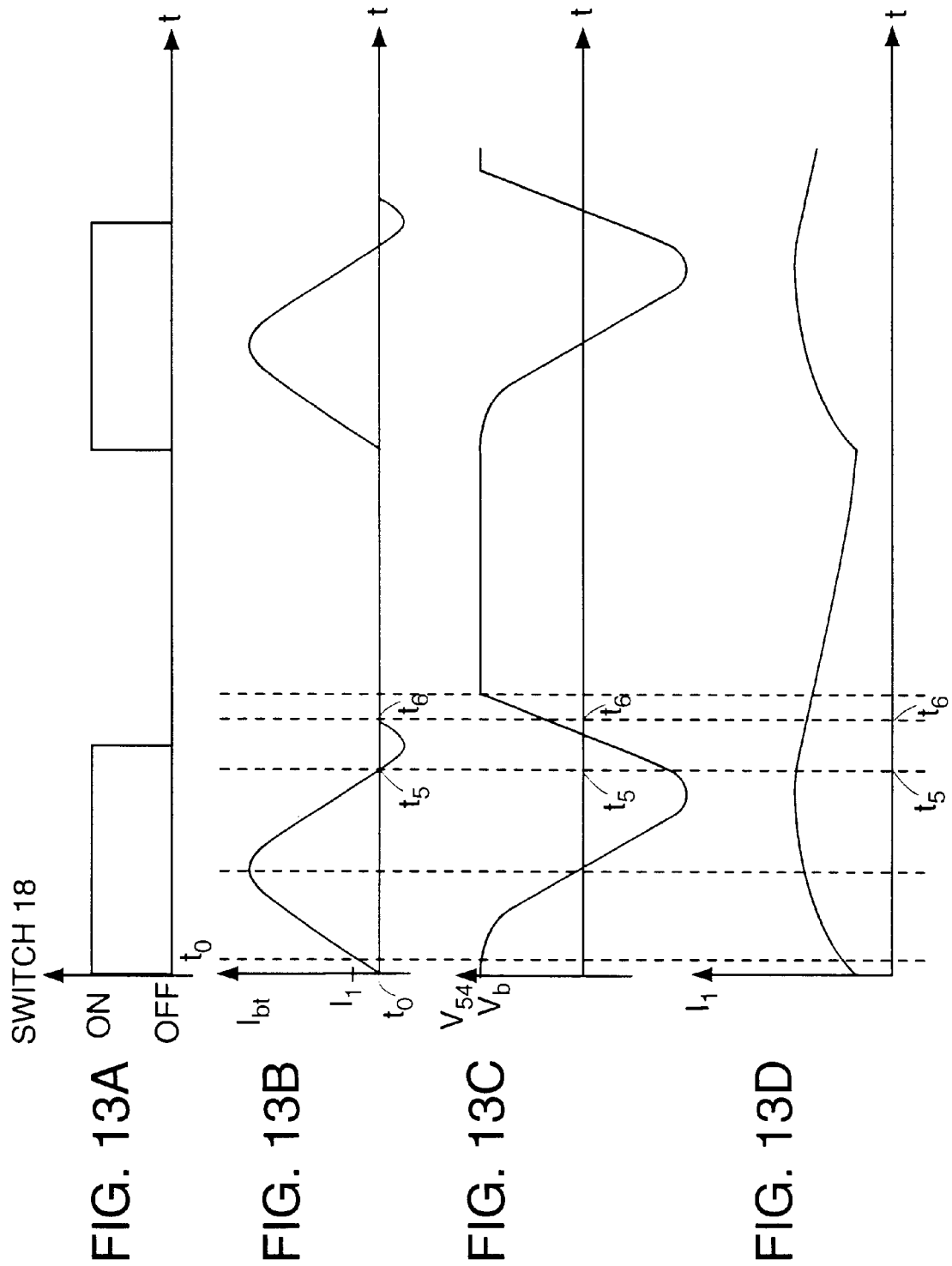

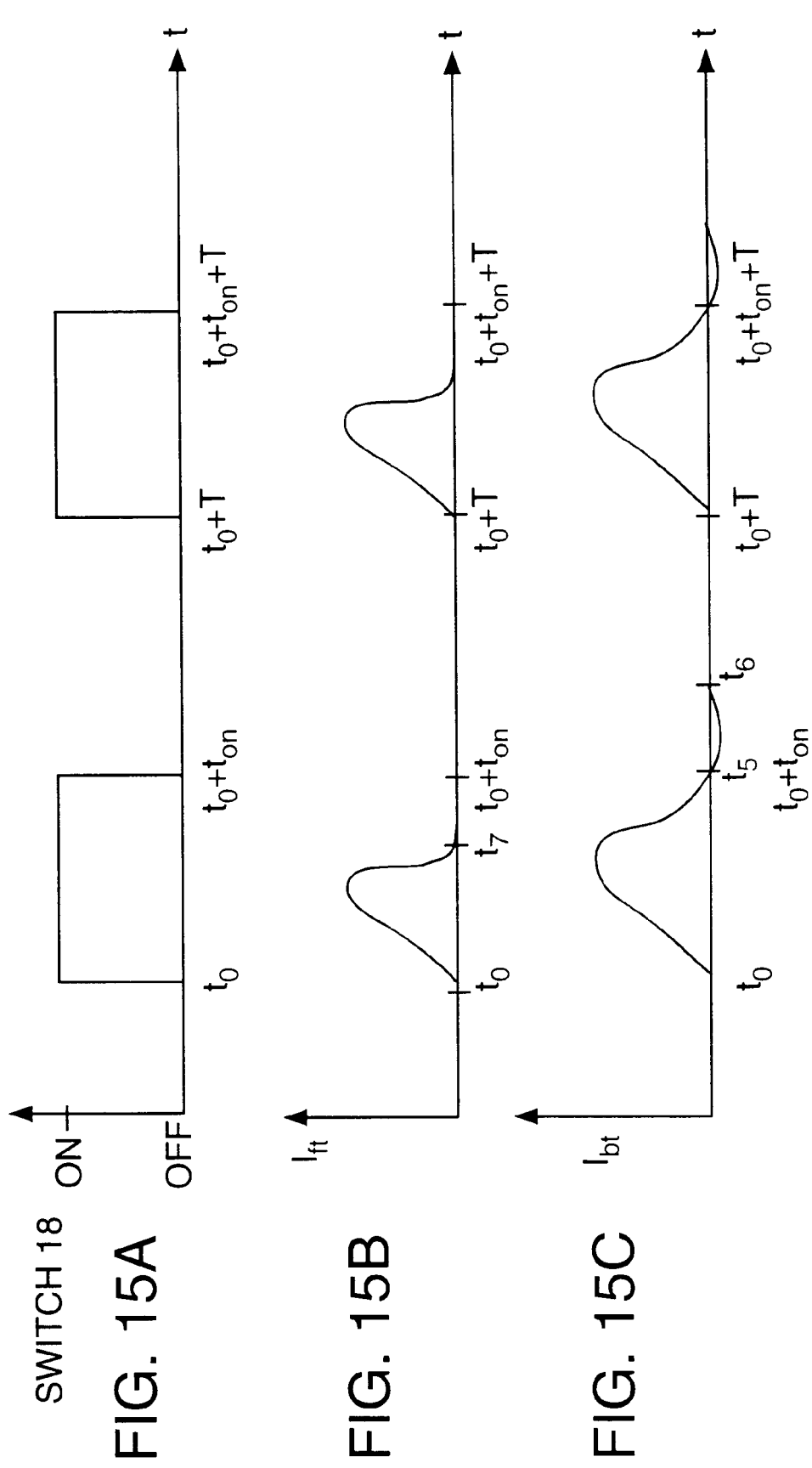

POWER FACTOR CORRECTION IN SWITCHING POWER CONVERSION

BACKGROUND OF THE INVENTION

The invention relates to power factor correction in switching power conversion.

Power factor correction techniques are used to increase the efficiency of conversion from an AC source to a DC load. Power factor correction reduces harmonic currents, thereby reducing the peak current demanded from the AC source. Non-fundamental harmonic currents do not contribute to power flow, but circulate in power distribution systems causing $I^2R$ losses. In Y-connected three-phase systems, harmonically pure currents of equal amplitude add to zero in the neutral connector. Harmonically rich currents, however, can add to a value that is higher than any individual phase current. Power factor correction attempts to assure that current is drawn from the AC source in amounts and at times that are proportional to and in phase with the usual sinusoidal variations in the voltage at the AC source.

One known way to achieve both power factor correction and a step down to a low DC load voltage is to cascade two power conversion stages. The circuit shown in FIG. 1 includes a first boost converter stage 1 that rectifies a bipolar input voltage from an AC source 12 in a bridge rectifier 2 and then boosts the voltage in an active current-shaping circuit 3. Power factor correction is achieved by a circuit 4 that includes a switch 5. The high DC voltage produced by the current-shaping circuit 3 is transformed by a fast-regulating DC-to-DC converter stage 6 that produces a usually lower voltage, isolated DC output voltage 7. In converter 6, energy is transferred through a transformer 8 in discrete packets that are defined by the opening and closing of a switch 9. Switch 9 is controlled by a feedback circuit 11 to maintain a regulated output voltage in the face of shifting source and load levels.

Attempts have been made to provide power factor correction in a simpler single power conversion stage. In such single-stage converters, the swing between the maximum and minimum values of the DC input voltage to the DC-to-DC isolating converter may be large. This voltage appears across a bulk capacitor, like capacitor 20 of FIG. 1. Variations in the AC source voltage and the load on the DC-to-DC converter can cause the bulk capacitor voltage 40 to have a swing of over 3:1. The DC-to-DC converter must operate over at least this same swing, which reduces the possibility for achieving an optimum design of the DC-to-DC power conversion elements. Large variations in the bulk capacitor voltage require the capacitor to handle large ripple currents. A 3-to-1 swing in the bulk capacitor voltage requires the capacitor to have a ripple current rating three times higher than a capacitor operating at high-end voltage for all input conditions.

The variation in the bulk capacitor voltage may be limited using a discontinuous conduction mode (DCM) boost AC-to-DC converter connected to a downstream DCM Flyback circuit. The bulk capacitor voltage tracks variations in AC input voltage to the AC-to-DC converter. If a DC source is used to drive the bulk capacitor, then the bulk capacitor voltage will track variations in the DC supply voltage. In either case, the DC-to-DC converter has to handle at least the range of variations of the bulk capacitor voltage.

SUMMARY OF THE INVENTION

In general, in one aspect, the invention features a power converter, for accepting power from a source and delivering power to a load, comprising conversion circuitry including a first side coupled to the source and a second side isolated from the first side and coupled to the load, energy storage circuitry, connected to the first side of the conversion circuitry, for storing energy at a voltage higher than the voltage of the source, and a switch arranged with respect to the conversion circuitry and energy storage circuitry to allow energy to be delivered from the source to the energy storage circuitry and a quantum of energy to be delivered to the second side of the conversion circuitry during a time that the switch is closed. Energy can be delivered to the energy storage circuitry and the quantum of energy delivered to the second side of the conversion circuitry during less than the entire time that the switch is closed.

Implementations of the invention may include one or more of the following features.

The conversion circuitry may be adapted to deliver a DC output voltage to the load and the power converter may further comprise a controller for regulating opening and closing of the switch to maintain the DC output voltage at a predetermined value. The controller may be adapted to alter a switching frequency of the switch. The controller may open the switch when there is substantially no current flowing through the switch. The controller may control the switch to operate at least one of the energy storage circuitry and the conversion circuitry in a short cycle mode. The controller may control the switch to operate at least one of the energy storage circuitry and the conversion circuitry in a long cycle mode.

The quantum of energy may have a characteristic time constant $T_c$. The characteristic time constant may be defined by an inductance L and a capacitance C such that $T_c = \pi * \text{sqrt}(LC)$. The inductance L and the capacitance C may be connected to the first side of the conversion circuitry. The inductance L and the capacitance C may be connected to the second side of the conversion circuitry. At least a portion of the inductance L may be a leakage inductance of a transformer.

The conversion circuitry may comprise a transformer providing the first and second isolated sides.

The conversion circuitry may include a boost inductive element and a bulk capacitor arranged to allow energy to be transferred from the boost inductive element to the bulk capacitor during a time that the switch is open.

The energy storage circuitry may be adapted to receive energy from a DC voltage source and the conversion circuitry may be adapted to deliver a DC voltage to the load.

The energy storage circuitry is adapted to receive energy from an AC voltage source and the conversion circuitry is adapted to deliver a DC voltage to the load. The energy storage circuitry may include a rectifier coupled to the AC voltage source. The energy storage circuitry may be arranged such that a current delivered from the source to the energy storage circuitry is substantially proportional to an instantaneous voltage level of the source. The power converter may further comprise a controller for regulating times at which the switch is opened and closed to maintain the DC output voltage at a predetermined value. The controller may be adapted to maintain a switching frequency of the switch essentially constant throughout each half-cycle of the AC source.

The energy storage circuitry may comprise a boost circuit. The energy storage circuitry may comprise a SEPIC converter. The energy storage circuitry comprises a flyback converter.

The energy storage circuitry may be arranged such that a current delivered from the source to the energy storage circuitry is substantially proportional to an instantaneous voltage level of the source.

In general, in another aspect, the invention features a method for use in converting power from a source to a load, the method comprising closing a switch, receiving energy from the source during at least a portion of the time that the switch is closed for storage in a first circuit at a voltage higher than the voltage of the source, and transferring, during at least a portion of the time that the switch is closed, a quantum of energy stored in the first circuit to a second circuit that is coupled to the load and is isolated from the first circuit.

Implementations of the invention may include one or more of the following. The switch may be opened when substantially no current is flowing through the switch. The switch may be opened and closed such that a DC output voltage supplied to the load is substantially maintained at a predetermined value. The second circuit may operate in a continuous conduction mode. The method may comprise opening and closing the switch such that at least one of the first and second circuits operates in a short cycle mode. The method may comprise opening and closing the switch such that at least one of the first and second circuits operates in a long cycle mode.

In general, in another aspect, the invention features a method of operating an AC-to-DC power conversion circuit that accepts energy from an AC input source and delivers energy to a load at a DC output voltage so that a time-varying waveform of an input current drawn from the AC input source is substantially in phase with a time varying waveform of a voltage delivered by the AC input source, the method comprising providing a first circuit configured to receive energy from the AC input source during at least a portion of the time that a switch is closed and to store received energy at a voltage higher than the voltage of the AC input source, an instantaneous current received from the AC input source being substantially proportional to an instantaneous voltage of the AC input source, providing a second circuit that is configured to couple a quantum of stored energy, during at least a portion of the time that the switch is closed, from the first circuit to the load and that is isolated from the AC input source, and controlling a frequency at which the switch is opened and closed to maintain the DC output voltage substantially at a predetermined value, the frequency being essentially constant throughout a half-cycle of the AC input source.

In general, in another aspect, the invention features an isolated, power factor correcting power converter, for accepting power from an AC source and delivering DC power to a load, comprising a boost circuit, coupled to the AC source through an input filter and a rectifier, for storing energy received from the AC source at a voltage higher than the voltage of the AC source in a bulk storage element, a transformer including a primary winding and a secondary winding isolated from the primary winding, the primary winding being coupled to the bulk storage element, an output circuit coupled to the secondary winding of the transformer and coupled to the load, a switch coupled to the boost circuit and to the primary winding, and a controller coupled to the switch and responsive to a voltage at the load to open and close the switch, wherein energy is delivered from the source to the boost circuit and a quantum of energy is delivered to the secondary winding during a time that the switch is closed by the controller.

Implementations of the invention may include one or more of the following.

The output circuit may comprise a buck circuit including a buck tank inductor and a buck tank capacitor connected in series with the secondary winding. The boost circuit may comprise a boost tank inductor, a boost tank capacitor, and a unidirectional conduction device connected in series with the switch, and is configured to operate in short cycle mode. The boost circuit may comprise a boost tank inductor and a boost tank capacitor connected in series with the switch, and a unidirectional conduction device connected in parallel with the switch, the boost circuit being configured to operate in long cycle mode.

The boost circuit may comprise a boost tank inductor and a boost tank capacitor connected in series with the switch, and a unidirectional conduction device connected in parallel with the switch, the boost circuit being configured to operate in long cycle mode, and the power converter may further comprise a buck tank including a buck tank inductor coupled in series between the primary winding and the switch, and a buck tank capacitor connected in parallel with the buck tank inductor and the switch, the buck tank configured to operate in long cycle mode.

The boost circuit may comprise a combined boost-buck tank including a boost-buck tank inductor and a unidirectional conduction device connected in series between the primary winding and the switch, the unidirectional conduction device permitting current flow from the primary winding toward the switch, the boost-buck tank further including a boost-buck tank capacitor connected in parallel with the boost-buck tank inductor, the unidirectional conduction device, and the switch.

The boost circuit may comprise a combined boost-buck tank including a boost-buck tank inductor and a unidirectional conduction device connected in series between the primary winding and the switch, the unidirectional conduction device permitting current flow from the primary winding toward the switch, the boost-buck tank further including a boost-buck tank capacitor connected in parallel with the primary winding.

The boost circuit may comprise a boost tank capacitor, and a boost tank inductor having a controllable inductance.

Among the advantages of the invention may be one or more of the following. The AC-to-DC converter has an isolated DC output run in continuous conduction mode (CCM) while the average AC source current has a high power factor with substantially no dead time and reduced harmonics. Power factor correction and isolation are achieved in one step. Power factor correction is achieved without a separate controller for drawing AC source current. The DC-to-DC converter has a high bandwidth. Zero current switching substantially eliminates switching losses. There is a short response time between load or source changes and circuit adaptations to deliver energy to the load as needed. Changes in the load create substantially no variation in input voltage to a DC-to-DC converter. Variation in source voltage may produce less than a 1-to-1 variation in the bulk capacitor voltage. Parallel connections of DC-to-DC converters reduces the number of semiconductors, and therefore semiconductor losses, in the current carrying paths. A DC-to-DC converter may be used with a variety of AC-to-DC converters or DC power supplies without requiring the DC-to-DC converter to withstand high input voltage swings. Harmonic current reduction in the AC lines reduces root mean squared (rms) current levels, allowing smaller, less lossy lines to deliver energy.

Other advantages and features will become apparent from the following description and from the claims.

BRIEF DESCRIPTION OF THE DRAWINGS

FIGS. 6A–6D, 7A–7B, 8A–8D and 9A–9D are waveform diagrams for the circuit of FIG. 5.

FIGS. 13A–13D, 14A–14C and 15A–15C are waveform diagrams for the circuit of FIG. 12.

DESCRIPTION OF THE PREFERRED EMBODIMENTS

Figure 1:
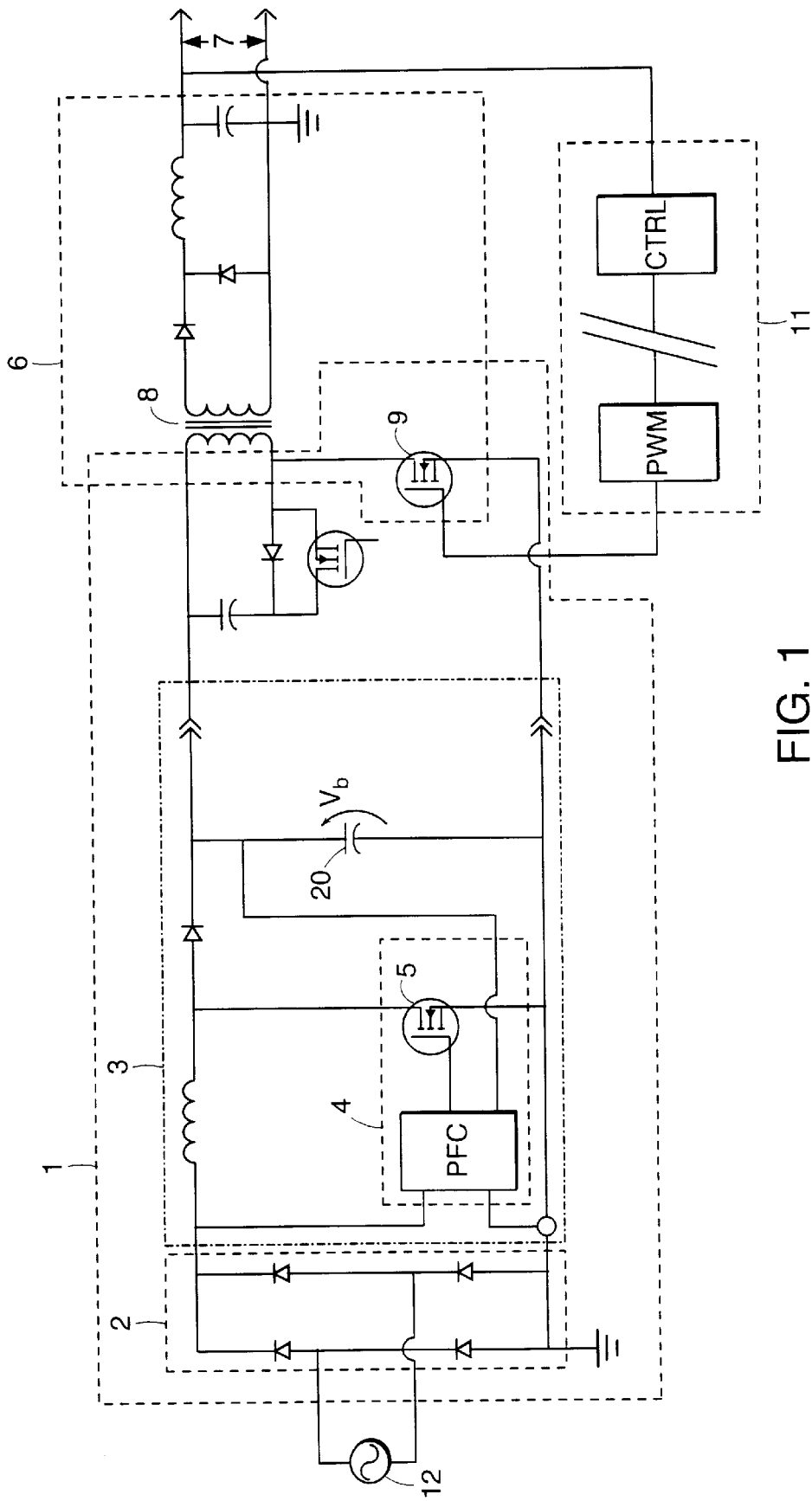
FIGS. 1–2 are diagrams of power conversion circuits.
Figure 2:
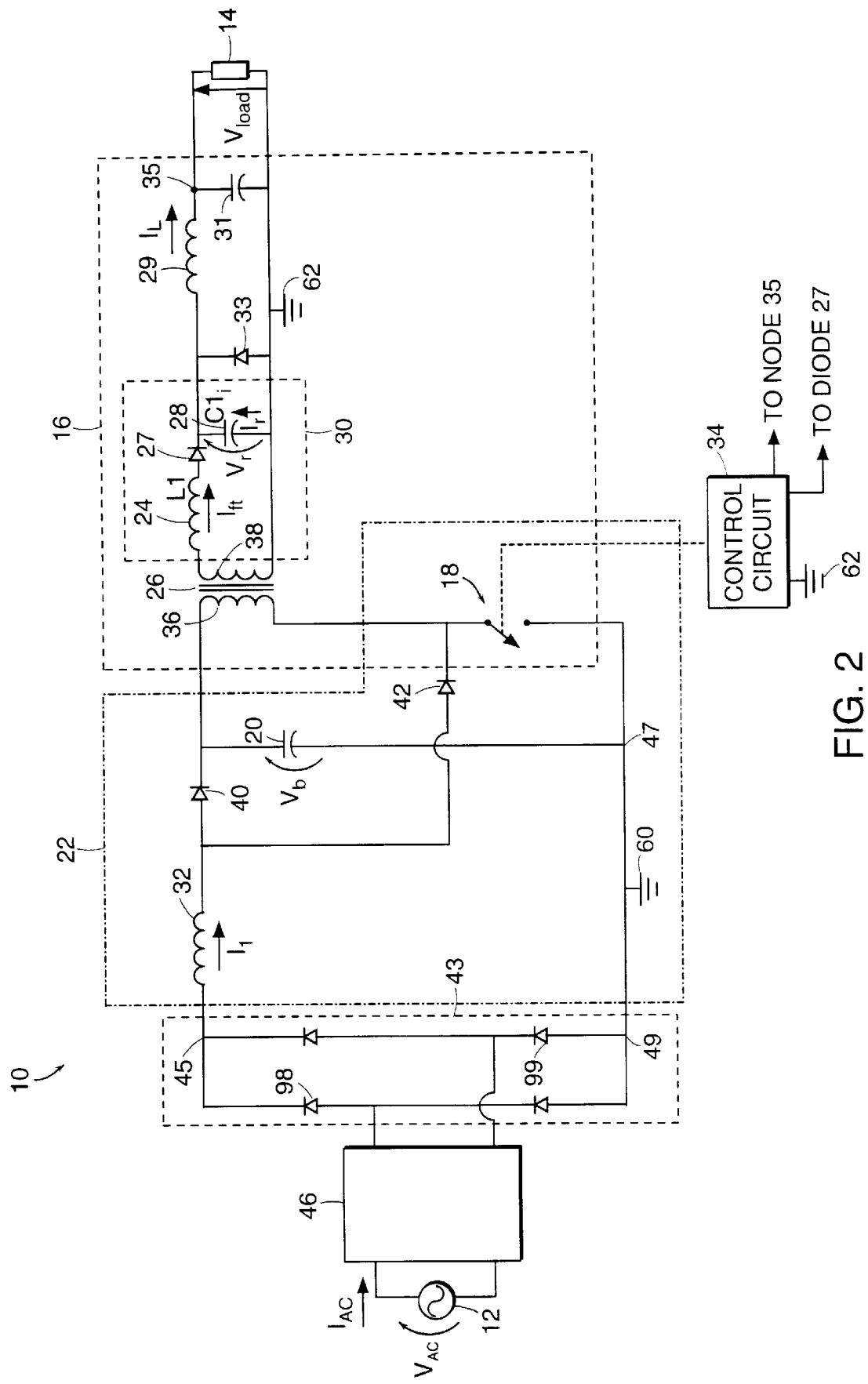

FIG. 2 shows a single-ended, isolated, power factor correcting AC-to-DC power conversion circuit 10. "Single ended" means that a single switching element 18 processes all of the power delivered from an AC input source 12 to a load 14. "Isolated" means that power is passed from the input source to the load via a transformer 26. As discussed below, the converter 10 operates in a discontinuous conduction mode ("DCM") in an input portion and in a continuous conduction mode ("CCM") in an output portion. The circuit 10 can achieve a near-unity power factor, i.e., a waveform of a source current $I_{AC}$ drawn from the AC source 12 will exhibit little, if any, phase shift relative to the waveform of an AC source voltage $V_{AC}$. Also, the variation in a voltage $V_b$ across a bulk capacitor 20, resulting from variations in the AC source voltage $V_{AC}$, is reduced relative to that which is exhibited in previous single-ended, isolated, power factor correcting converters. While the same identifiers (e.g., numbers) are used in multiple figures below, the items in the different figures do not necessarily have the same components, configurations of components, values or parameters, e.g., inductance, capacitance, or switching frequency.

The converter 10 includes an AC source 12, a load 14, a control circuit 34, an input filter 46, a rectifier 43, and two power conversion circuits 16 and 22 that share a switching element 18. The boost power conversion circuit 22 accepts energy from the AC input source 12, via the filter 46 and the full-wave rectifier 43, and delivers energy to the bulk capacitor 20 and to the zero-current switching ("ZCS") buck power conversion circuit 16. The ZCS buck converter 16 delivers power to the load 14 via an isolation transformer 26. The boost converter 22, rectifier 43 and filter 46 comprise an input portion of the converter 10, and the buck converter 16 comprises an output portion of the converter 10. The control circuit 34 controls the opening and closing of the switch 18. The voltage $V_b$ across the bulk capacitor 20 is essentially constant during an operating cycle of the AC input source 12.

The boost power conversion circuit 22 includes a boost inductor 32, the switch 18, the bulk capacitor 20, and two diodes 40 and 42. The boost inductor 32 serially couples a high-side node 45 of the rectifier 43 to the anodes of the diodes 40 and 42, respectively. The cathode of the diode 40 is serially coupled through the bulk capacitor 20 to a node 47, which is connected to a primary-side ground 60, and is serially coupled through a primary winding 36 of the transformer 26 to the cathode of the diode 42, which is serially coupled through the switch 18 to node 47. The diodes 40 and 42 are arranged to prevent current from flowing through the boost inductor 32 toward the rectifier 43. The node 47 is coupled to a low-side node 49 of the rectifier 43.

The ZCS buck converter 16 is of the kind described in Vinciarelli, U.S. Pat. No. 4,415,959, "Forward Converter Switching at Zero Current," assigned to the assignee of this application and incorporated herein by reference. The ZCS buck converter 16 includes the switch 18, the transformer 26, a buck tank circuit 30 comprising a buck tank capacitor 28 and a buck tank inductor 24 (all or a portion of which may be the leakage inductance of the transformer 26), a diode 33, an output inductor 29, and an output capacitor 31. The buck tank inductor 24 and the buck tank capacitor 28 are connected in series with a secondary winding 38 of the transformer 26, which is connected to a secondary-side ground 62 (not necessarily the same as primary-side ground 60). The diode 33 is coupled in parallel with the buck tank capacitor 28. The diode 27 and the windings 36 and 38 of the transformer 26 are arranged (e.g., directed or poled) so that energy is transferred forward toward the load 14, via the transformer 26 and the diode 27, during the on time of the switch 18. The diode 33 is arranged to carry current flowing in the output inductor 29 in the direction of the load 14. The diode 33 is coupled in parallel with the series combination of the output inductor 29 and the output capacitor 31. The output capacitor is coupled in parallel with the load 14. The control circuit 34 is connected, e.g., across the diode 27 to monitor a transfer current $I_{ft}$ in the buck tank inductor 24, and to a node 35 and ground 62 in order to monitor an output voltage $V_{load}$ across the load 14 and the output capacitor 31.

Figure 3:
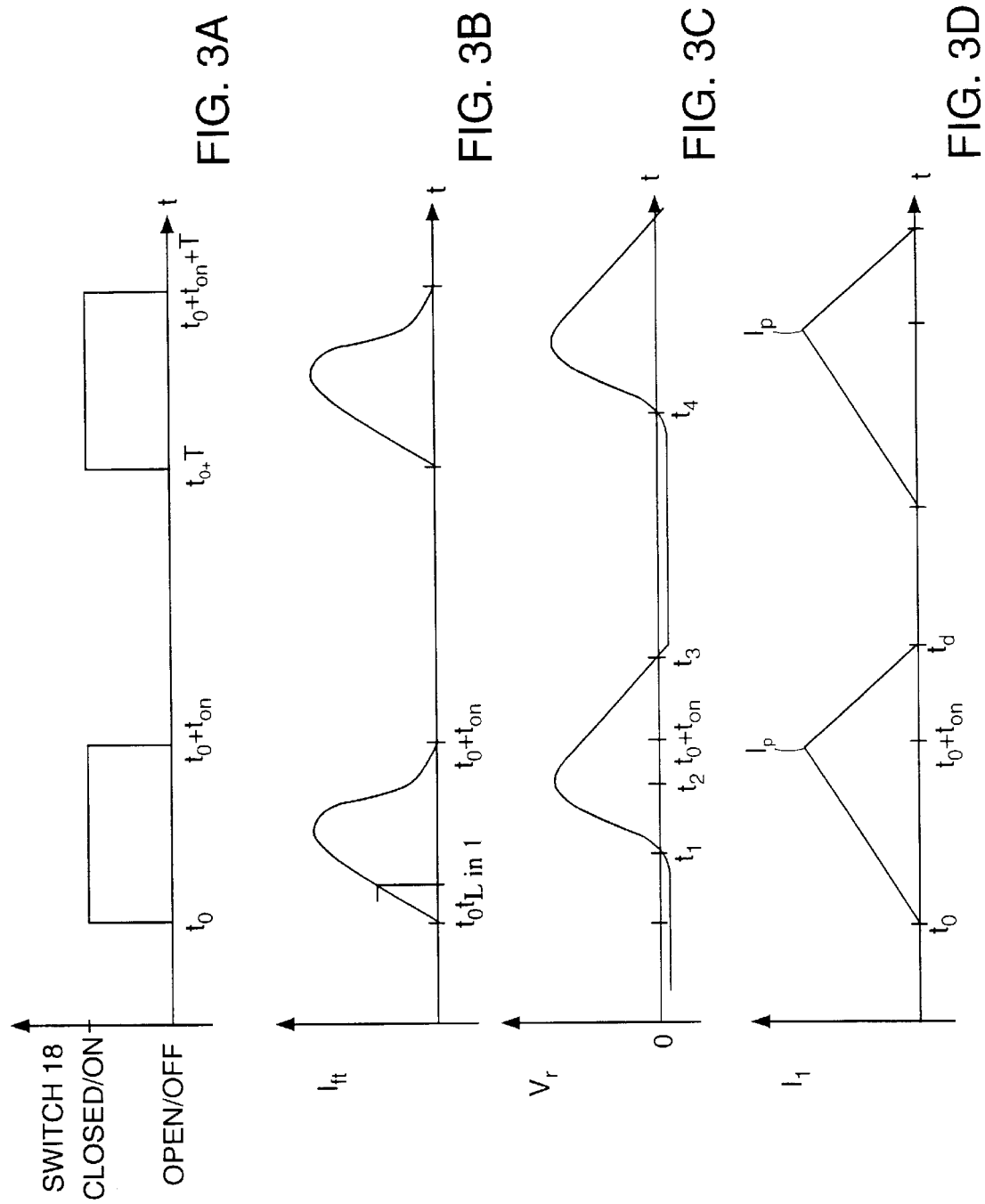
FIGS. 3A–3D and 4A–4B are waveform diagrams for the circuit of FIG. 2.
Figure 4:
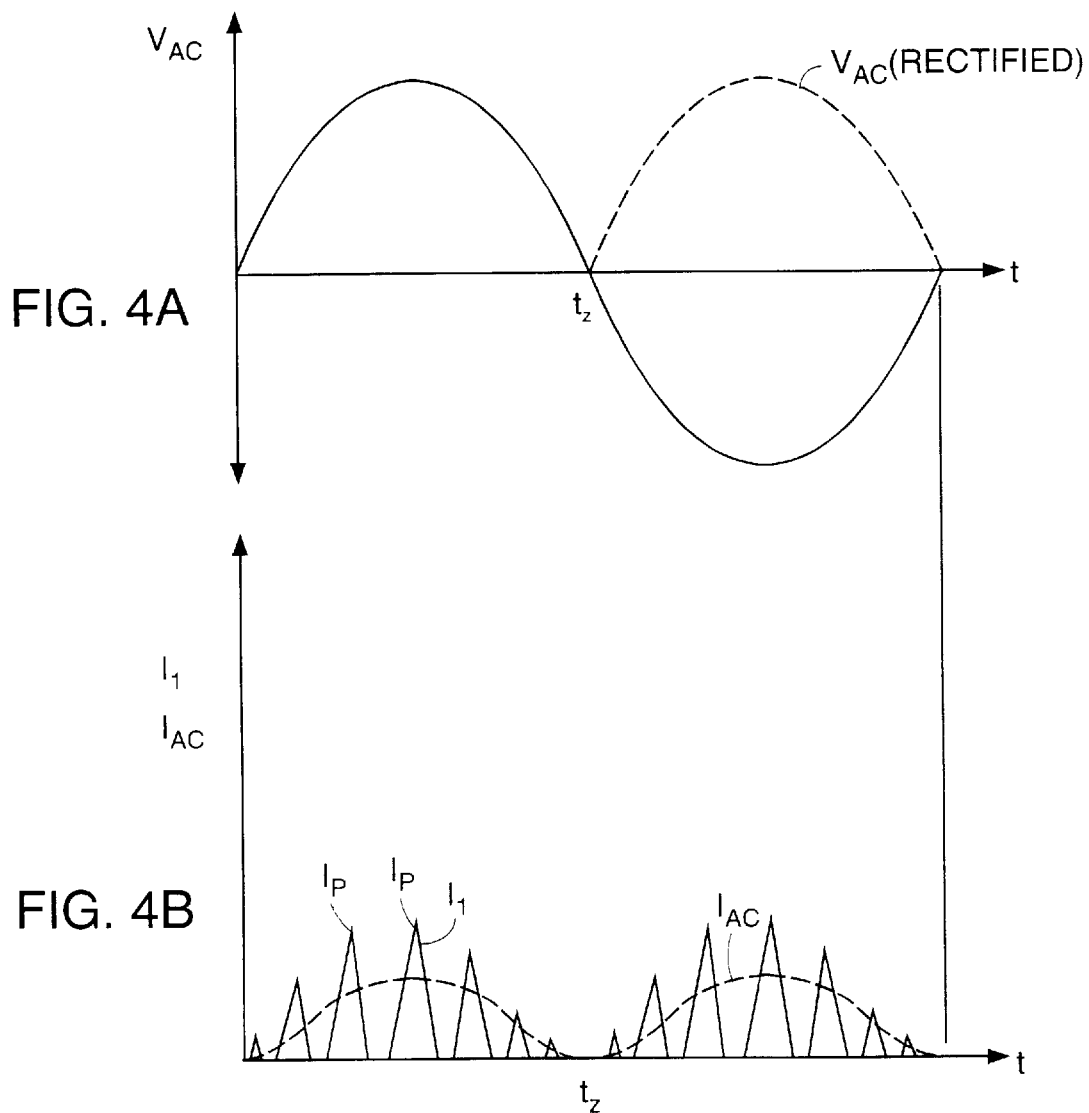

The switch 18 regulates energy flow in the ZCS buck converter 16. When the switch 18 is closed, the voltage $V_b$ is impressed across the primary winding 36 and drives the buck tank 30. As illustrated in FIGS. 3A and 3B, the transfer current $I_{ft}$ in the buck tank inductor 24 is zero when the switch 18 closes at time $t_0$. With the switch 18 closed, the transfer current $I_{ft}$ rises linearly until, at time $t_{Lin1}$, it equals an output current $I_L$ flowing through the output inductor 29. Then, the transfer current $I_{ft}$ rises and falls essentially sinusoidally, with a characteristic time constant $T_{c1}=\pi*\text{sqrt}(L_1*C_1)$, until, after a time $t_{on}$, the transfer current $I_{ft}$ returns to zero when the diode 27 ceases conducting. As the load 14 varies from no load to maximum load, the variation in $t_{on}$ is bounded between $T_{c1}$ and $1.5*T_{c1}$. The control circuit 34 opens the switch 18 at essentially the time when the transfer current $I_{ft}$ returns to zero. This causes a bounded quantum (i.e., packet) of energy to be transferred forward from the bulk capacitor 20 toward the load 14, as described more fully in U.S. Pat. No. 4,415,959.

Operation of the converter 10 during a converter operating cycle will be explained with reference to FIGS. 3A–3D and 4A–4B. The bulk capacitor voltage $V_b$ is assumed to be essentially constant throughout the operating cycle.

Closure of the main switch 18, at time $t_0$, initiates two energy transfer events: one from the bulk capacitor 20 through the transformer 26 and the ZCS buck converter 16 to the load 14 and the other from the AC source 12 into the boost inductor 32 (having an inductance $L_{bst}$), via the full wave rectifier 43. As described above, FIG. 3B shows that the transfer current $I_{ft}$ is zero when the switch 18 closes at time $t_0$ and rises and falls as a discrete quantum of energy is resonantly transferred toward the load 14. At time $t_0+t_{on}$, the transfer current $I_{ft}$ returns to zero and the switch 18 is opened by the control circuit 34. FIG. 3C shows that the buck tank capacitor voltage $V_r$ is initially slightly less than zero, rises as the transfer current charges the buck tank capacitor 28, and drops essentially linearly as the buck tank capacitor 28 discharges into, thereby charging, the output inductor 29. FIG. 3D shows that between $t_0$ and $t_{on}$, when the rectified input source voltage is impressed across the boost inductor 32, a current $I_1$ in the boost inductor 32 increases.

After the switch 18 turns off, all of the energy is withdrawn from the boost inductor 32 and the current $I_1$ in the boost inductor 32 returns to zero between time $t_0+t_{on}$ and $t_d$ (FIG. 3D). This operating mode, in which all of the energy is withdrawn from the boost inductor 32 during each operating cycle of duration/period T, and the current in the inductor returns to zero prior to the end of the operating cycle, is called a "discontinuous conduction model" ("DCM").

During the time that the switch 18 is off, energy is also transferred from the buck tank capacitor 28 toward the load 14, via the output inductor 29. The inductance of the output inductor 29 is made sufficiently large so that the ZCS buck converter 16 operates in a continuous conduction mode ("CCM"). In CCM, an output current $I_L$ in the output inductor 29 can be assumed to be flowing towards the load 14 throughout the entire converter operating cycle. As shown in FIG. 3C, the buck tank capacitor 28 is discharged to essentially zero voltage between times $t_2$ and $t_3$. Between times $t_3$ and $t_4$, the output current $I_L$ decreases slightly when flowing in the freewheeling diode 33. The output inductor 29 and output capacitor 31 are sized to smooth the fluctuations in the current $I_L$ and produce an essentially constant DC output voltage $V_{load}$.

During the time that the switch 18 is off/open, the transformer 26 is reset, e.g., by impressing a reversed voltage across the primary winding 36 as more fully described in Vinciarelli, U.S. Pat. No. 4,441,146, "Optimal Resetting of the Transformer's Core in Single Ended Forward Converters," assigned to the assignee of this application and incorporated herein by reference.

The control circuit 34 controls a converter switching frequency $f_s$ (i.e., $f_s=1/T$, the rate at which the switch 18 is opened and closed) in order to maintain the output voltage $V_{load}$ at a predetermined value as circuit conditions change. Because the ZCS buck converter 16 transfers a bounded packet of energy toward the load 14 during each converter operating cycle, power flow will vary with switching frequency $f_s$. The control circuit 34 adjusts the switching frequency $f_s$ of the switch 18 to regulate the output voltage $V_{load}$ despite variations in operating conditions (e.g., input voltage, load, or temperature). For example, if the load 14 requires more power (as indicated, e.g., by a decrease in the output voltage $V_{load}$ relative to the predetermined reference value) the control circuit 34 increases the switching frequency $f_s$, and vice versa. In this way, the output voltage $V_{load}$ is held essentially constant.

Because the switching frequency $f_s$ of the converter 10 is much higher than the frequency of the AC source 12, the voltage impressed across the boost inductor 32 is essentially constant during each operating cycle of the converter 10. As a result, in DCM the peak current in the boost inductor 32, $I_p=(V_{ac}*t_{on})/L_{bst}$ (FIG. 3D), is proportional to the value of the source voltage $V_{ac}$, minus bias voltages of, e.g., a rectifier diode and diode 42, during the operating cycle. Since the variation in $t_{on}$ is bounded, the peak values $I_p$ of the boost inductor current $I_1$, as shown in FIGS. 4A and 4B, varies in proportion to the time-varying source voltage $V_{ac}$. For clarity, FIG. 4B shows only a few energy packets per half cycle of the AC source.

The filter 46 is connected between the AC source 12 and the rectifier 43 to average the boost inductor current $I_1$, thereby reducing high frequency components of the current drawn from the source (i.e., components associated with the rapid rise and fall of the discontinuous boost inductor current $I_1$ waveform). Thus, the source current $I_{AC}$ (FIG. 4B) resembles a sinusoid in phase with the AC source voltage $V_{AC}$, exhibiting few harmonics and yielding good PFC. Because the source voltage $V_{AC}$ only needs to overcome small bias voltages before the boost inductor 32 will conduct current, the source current $I_{AC}$ has substantially no dead time when the source voltage $V_{AC}$ is near zero.

The bulk capacitor 20 is sized so that the bulk capacitor voltage $V_b$ remains essentially constant, i.e., has a small ripple, throughout each half-cycle of the AC line frequency. The small ripple on the bulk capacitor 20 allows the converter 10 to have a high bandwidth, e.g., to have an operating frequency of about 10–30 KHz or higher. If the bulk capacitor voltage $V_b$ had a large ripple over the AC half-cycle, then the control circuit 34 would respond to the ripple within a few converter cycles by changing the operating frequency of the converter 10, and the converter 10 would not reach a stable operating frequency. By sizing the bulk capacitor 20 to have a small voltage ripple, the converter 10 will reach a steady state operating frequency for stable operating conditions, e.g., load 14 and source voltage $V_{AC}$.

However, as the average value of the rectified source voltage $V_{ac}$ varies, the bulk capacitor voltage $V_b$ also varies. The degree of variation in the bulk capacitor voltage $V_b$ depends on the values of the boost inductor 32 and the characteristic impedance of the ZCS converter 16, $Z_c=\text{sqrt}(L_1/C_1)$, where $L_1$ is the inductance of the buck tank inductor 24 and $C_1$ is the capacitance of the buck tank capacitor 28, since these values determine the relative amounts of energy delivered to, and withdrawn from, the bulk capacitor 20 by the boost converter 22 and the ZCS buck converter 16, respectively, during each operating cycle of the converter 10. Relative variations in the source voltage $V_{ac}$ result in smaller relative variations in the bulk capacitor voltage $V_b$ depending on the size of the boost inductance $L_{bst}$.

Operation of zero-current switching boost power converters is described in Vinciarelli, U.S. Pat. No. 5,321,348 (The '348 patent), "Boost Switching Power Conversion," assigned to the assignee of this application and incorporated herein by reference. As explained in the '348 patent, "short cycle mode" is an operating mode in which the switch opens at or near the first instance in time that the current returns to zero following switch closure and "long cycle mode" is an operating mode in which the switch opens at or near the second (or a succeeding) instance in time that the current returns to zero following switch closure. The term "quantized" as applied to energy transfer indicates that energy is transferred in discrete, bounded, packets or "quanta", each quantum having a characteristic time constant $T_c=\pi*\text{sqrt}(LC)$, where L and C are circuit inductance and capacitance, respectively.

Figure 5:
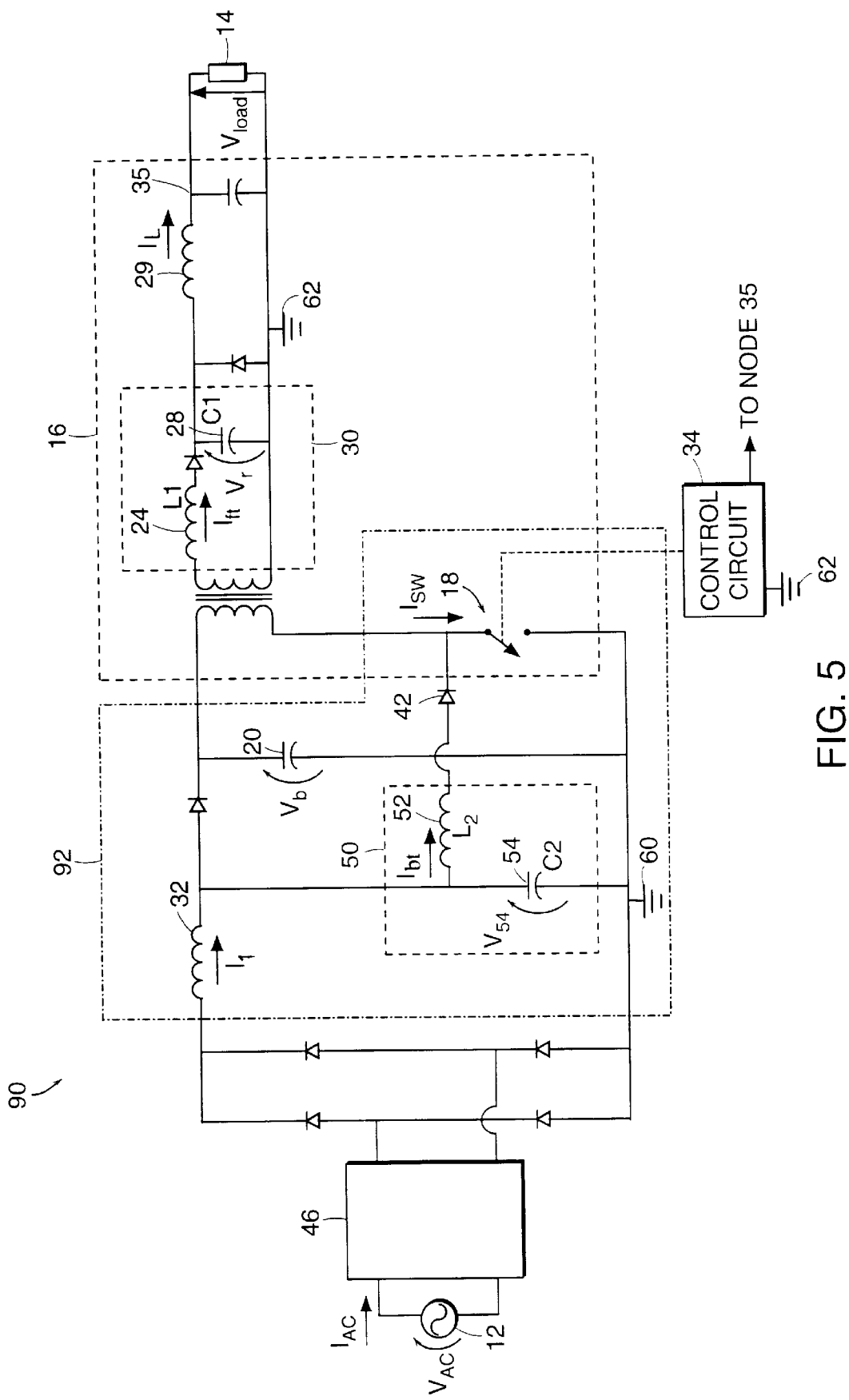
FIG. 5 is a diagram of a power conversion circuit.

FIG. 5 shows a single-ended, isolated, power factor correcting AC-to-DC power conversion circuit 90. As discussed below, the boost portion of the converter 90 operates in short cycle mode, allowing design flexibility to achieve a desired bulk capacitor voltage $V_b$ by adjusting resonant frequencies and impedances of portions of the converter 90. The buck converter 16 also operates in short cycle mode. The boost and buck portions of the converter 90 both operate in CCM. Because the boost portion operates in CCM, the filter 46 for averaging the boost inductor current $I_1$ in the converter 90 uses smaller components than the filter 46 used in the converter 10 shown in FIG. 2 while achieving a near-unity power factor with even fewer harmonics than the converter 10.

The converter 90 includes the ZCS buck converter 16 shown in FIG. 2, and a boost circuit 92 that is the same as the boost circuit 22 shown in FIG. 2 except that boost circuit 92 includes a boost tank circuit 50. The boost tank 50 includes a boost tank inductor 52 serially coupled between the boost inductor 32 (having an inductance $L_2$) and the diode 42, and a boost tank capacitor 54 (having a capacitance $C_2$) coupled in parallel with the serial connection of the boost tank inductor 52, the diode 42, and the switch 18. The control circuit 34 is connected to the switch 18, to ground 62, and to node 35.

The operation of the converter 90 during a converter operating cycle will be explained with reference to FIGS. 3A–3D and FIGS. 6A–6D. The voltage $V_b$ across the bulk capacitor 20 is assumed to be essentially constant during the operating cycle. The boost inductor 32 is sufficiently large so that the converter 90 can run in CCM.

Closure of the switch 18 initiates two energy transfer events: one from the bulk capacitor 20 through the transformer 26 and the ZCS buck converter 16 to the load 14 and the other from the AC source 12 into the boost inductor 32 and the boost tank 50. The energy transfer from the bulk capacitor 20 toward the load 14 is the same as described above in relation to FIGS. 3A–3C. Regarding the energy transfer from the AC source 12 to the boost inductor 32, FIGS. 6A and 6B show that the boost tank current $I_{bt}$ rises linearly until it equals the boost inductor current $I_1$ at time $t_{Lin2}$. Then, the boost tank current $I_{bt}$ rises and falls essentially sinusoidally, with a characteristic time constant $T_{c2}$= $\pi$*sqrt($L_2$*$C_2$), until, after a time $t_{on}$, the boost tank current $I_{bt}$ returns to zero and the diode 42 ceases conducting. This causes a bounded quantum of energy, the amount of which is, in part, determined by the characteristic impedance $Z_{50}$=sqrt($L_2/C_2$) of the boost tank 50, to be transferred from the AC source 12 to the boost inductor 32. The peaks of the boost inductor current $I_1$ are proportional to the instantaneous rectified source voltage $V_{AC}$ minus small diode bias voltages. Thus, FIG. 6C shows that the boost inductor current $I_1$ increases while the switch 18 is closed. This mode, where the boost tank current $I_{bt}$ is prevented from dropping below zero, is called "short cycle mode."

After the switch 18 turns off, energy is transferred from the buck tank capacitor 28 toward the load 14 as described above, and from the boost inductor 32 to the bulk capacitor 20. Thus, as shown in FIG. 6D, the bulk capacitor voltage $V_b$ decreases while the transfer current $I_{ft}$ is positive (here, while the switch 18 is on/closed, FIGS. 3A–3B), and increases while the boost inductor current $I_1$ charges the bulk capacitor 20 while the switch 18 is off.

Figure 7A:
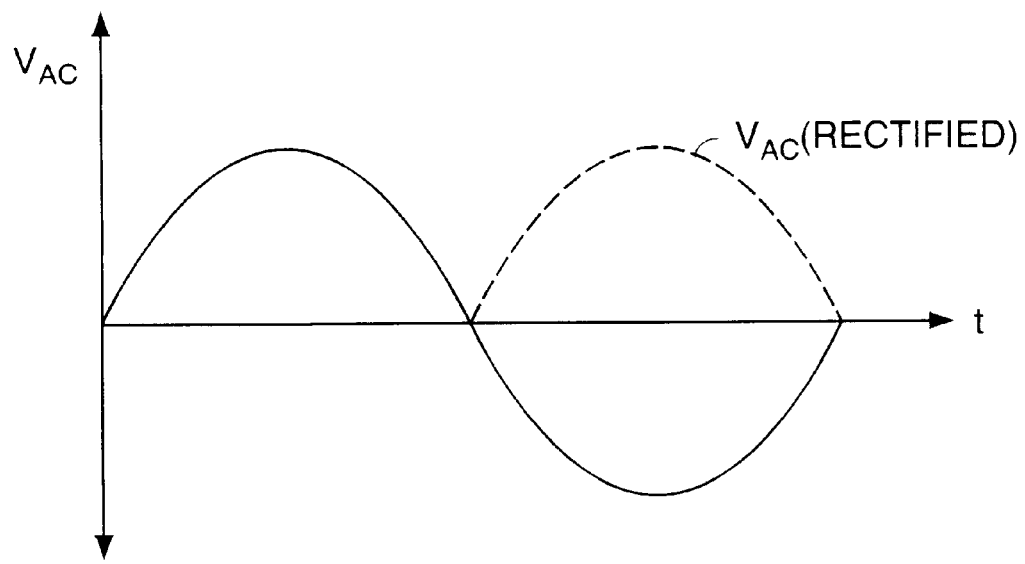
Figure 7B:
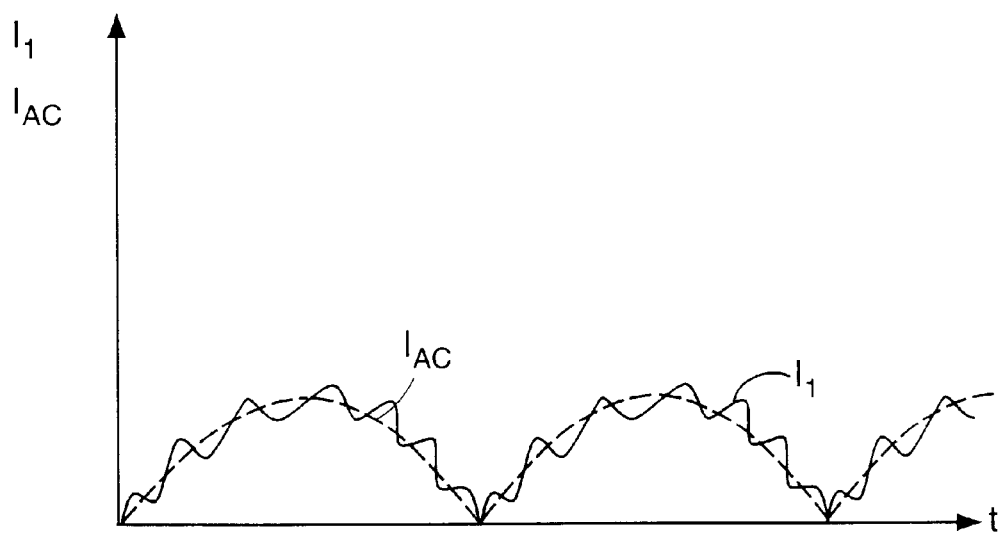

Because the boost inductor 32 is sized to run in CCM, the boost inductor current $I_1$ does not return to zero before the switch 18 closes again as shown in FIG. 6C. Comparing FIGS. 7A–7B (for clarity, FIG. 7B only shows a few energy packets per half cycle of the AC source 12) with FIGS. 4A–4B shows that the boost inductor current $I_1$ of converter 90 shown in FIG. 7B more closely approximates a sinusoid than the boost inductor current $I_1$ in the converter 10 (FIG. 4B). Thus, the filter 46 can be made with smaller components than those used for the filter 46 in the converter 10 shown in FIG. 2. The reduced ripple current in the boost current $I_1$ also means that the bulk capacitor 20 of the converter 90 has a reduced ripple requirement compared to the bulk capacitor 20 of the converter 10. As with the converter 10, the source current $I_{AC}$ shown in FIG. 7B has substantially no dead time when the source voltage $V_{AC}$ is near zero.

The switch 18 in the converter 90 is, preferably, opened when both the boost tank current $I_{bt}$ and the transfer current $I_{ft}$ are zero. As shown in FIGS. 8A–8C and 9A–9C, the current in the boost tank, $I_{bt}$, may return to zero prior to the time that the current in the buck tank, $I_{ft}$, returns to zero (FIGS. 8A–8C), or vice versa, depending on the relative values of the resonant frequencies of the two tank circuits 30 and 50. Because the current $I_{sw}$ in the switch 18 (FIGS. 8D and 9D) is the sum of the boost tank current $I_{bt}$ and the transfer current $I_{ft}$ scaled by the turns ratio of the transformer 26, the control circuit 34 monitors the switch current $I_{sw}$ and opens the switch 18 after the switch current $I_{sw}$ reaches zero. In this way, the switch 18 can be opened at a time when both of the currents $I_{bt}$ and $I_{ft}$ have reached zero.

Using short cycle mode, several design parameters influence the bulk capacitor voltage $V_b$. In short cycle mode, the bulk capacitor voltage $V_b$ can be expressed as:

$$V_b \cong V_{AC} + V_{LOAD} \frac{f_{30}}{f_{50}} \frac{N_P}{N_S} \frac{F_{boost}(V_{AC}, Z_{50}, V_b)}{F_{buck}(V_{Load}, Z_{30}, V_b)} \qquad (1)$$

where: $f_{30}$=1/($\pi$*sqrt($L_1$*$C_1$)) and $f_{50}$=1/($\pi$*sqrt($L_2$*$C_2$)) are the resonant frequencies of the buck tank 30 and boost tank 50, respectively; $N_p/N_s$ is the turns ratio of the transformer 26; the ratio of $F_{boost}$ and $F_{buck}$ represents a scaling function that depends on the source voltage $V_{AC}$, the bulk capacitor voltage $V_b$, the load voltage $V_{Load}$, the boost tank impedance $Z_{50}$ and an impedance $Z_{30}$ of the buck tank 30. Thus, the AC source voltage $V_{AC}$, the boost tank and buck tank impedances $Z_{50}$ and $Z_{30}$, and the boost tank and buck tank resonant frequencies $f_{50}$ and $f_{30}$ can be adjusted to achieve a desired bulk capacitor voltage $V_b$ for a given load voltage $V_{Load}$. The AC source voltage $V_{AC}$ may vary over a "universal input range," i.e., the range of input voltages used in major marketplaces, typically 90–270 VAC rms, which equates to a 3:1 range of input voltages.

Figure 10:
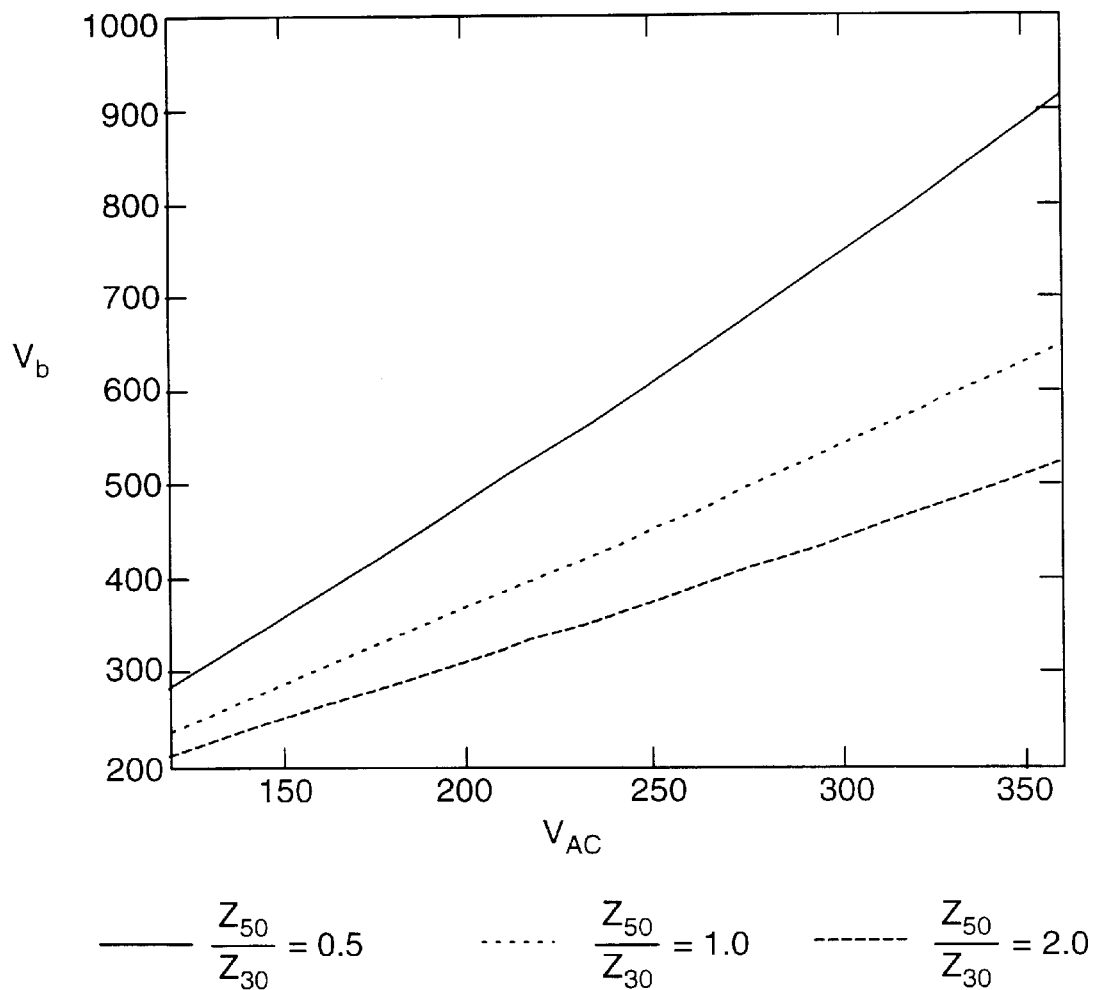
FIGS. 10–11 are bulk capacitor voltage diagrams.

FIG. 10 shows the variation in bulk capacitor voltage $V_b$ as a function of a ratio $r_z=Z_{50}/Z_{30}$ of boost tank impedance $Z_{50}$ to buck tank impedance $Z_{30}$ for a 3:1 AC source voltage swing. As the ratio $r_z$ increases, the bulk capacitor voltage $V_b$ decreases both in the difference of maximum to minimum voltage (i.e., magnitude swing) and the ratio of maximum to minimum voltage (i.e., relative swing). Thus, using a higher ratio $r_z$ of boost tank impedance $Z_{50}$ to buck tank impedance $Z_{30}$ allows the bulk capacitor 20 to be designed to operate over a smaller magnitude swing and a smaller relative swing than if a smaller ratio $r_z$ is used.

Figure 11:
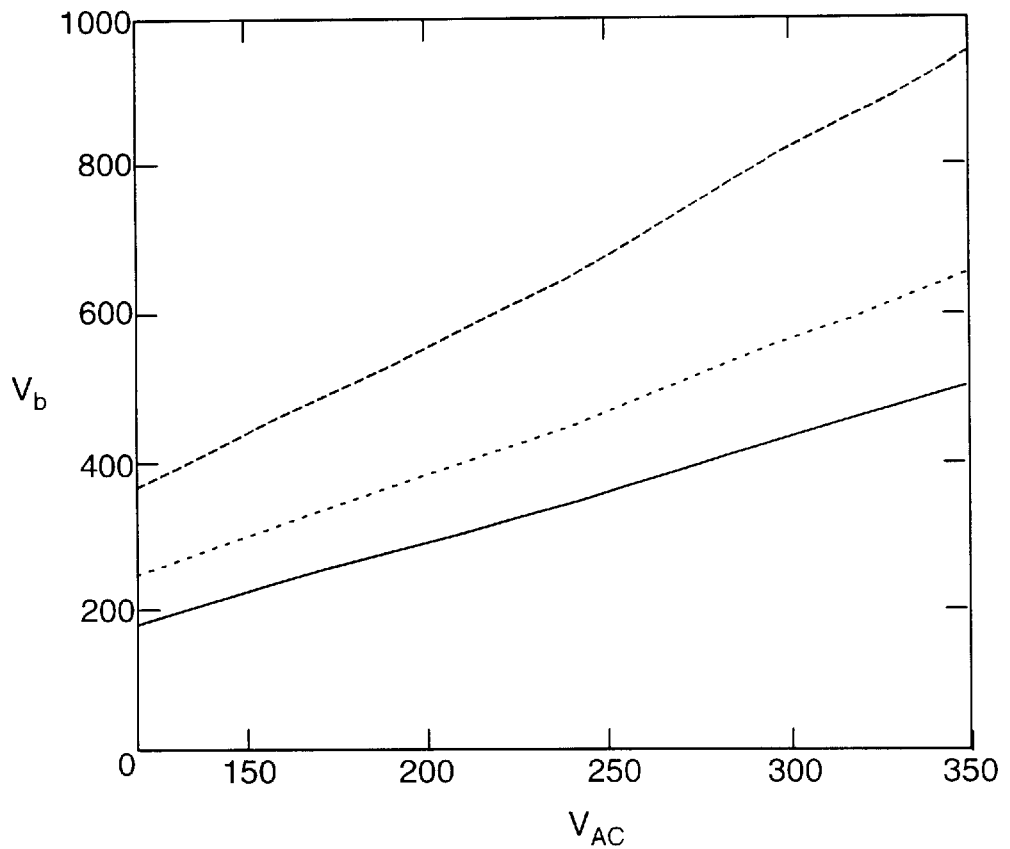

FIG. 11 shows the variation in bulk capacitor voltage $V_b$ as a function of a ratio $r_f$ of the buck tank resonant frequency $f_{30}$ to the boost tank resonant frequency $f_{50}$. As the ratio $r_f$ increases, the magnitude of the bulk capacitor voltage $V_b$ increases but the relative swing of $V_b$ decreases. Thus, using a higher ratio $r_f$ of boost tank resonant frequency $f_{50}$ to buck tank resonant frequency $f_{30}$ allows the bulk capacitor 20 to be designed to operate over a smaller relative swing but requires the bulk capacitor 20 to withstand higher magnitude voltages than if a lower ratio $r_f$ is used.

Figure 12:
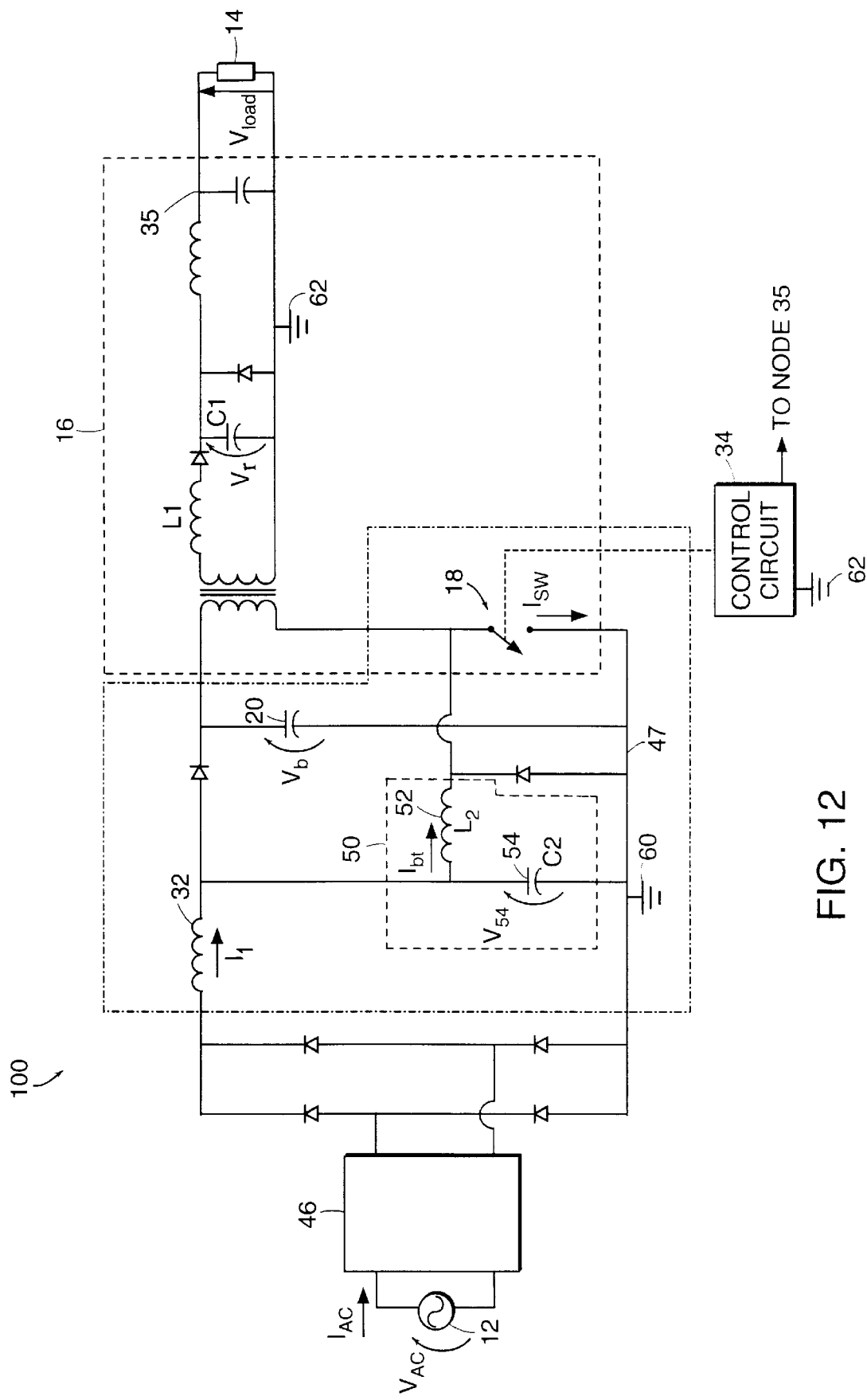
FIG. 12 is a diagram of a power conversion circuit.
Figure 14A:
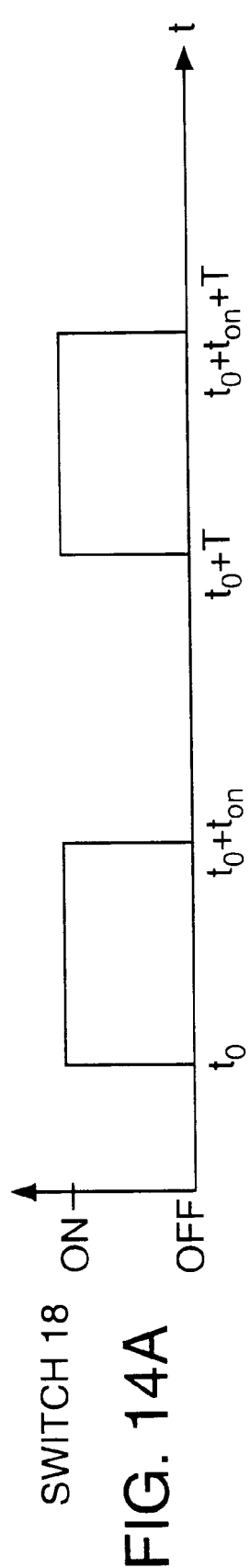
Figure 14B:
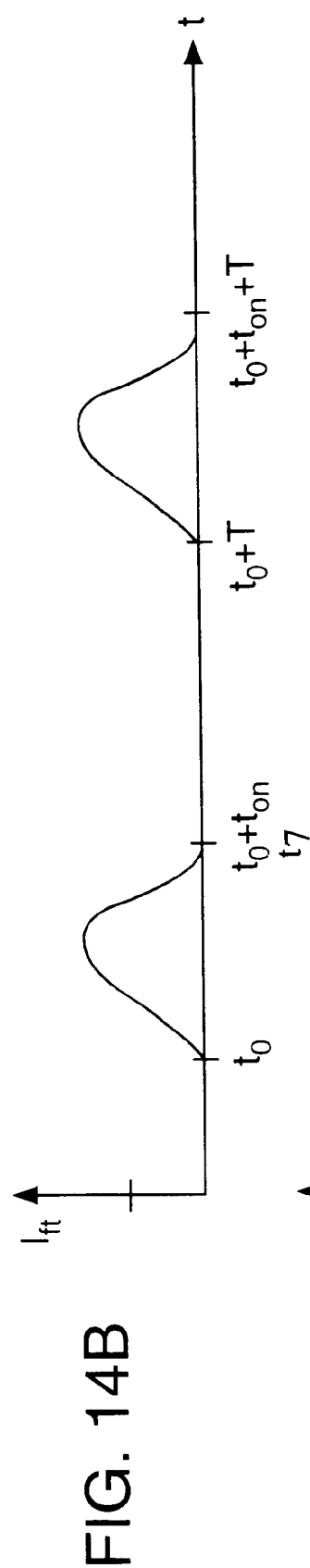
Figure 14C:
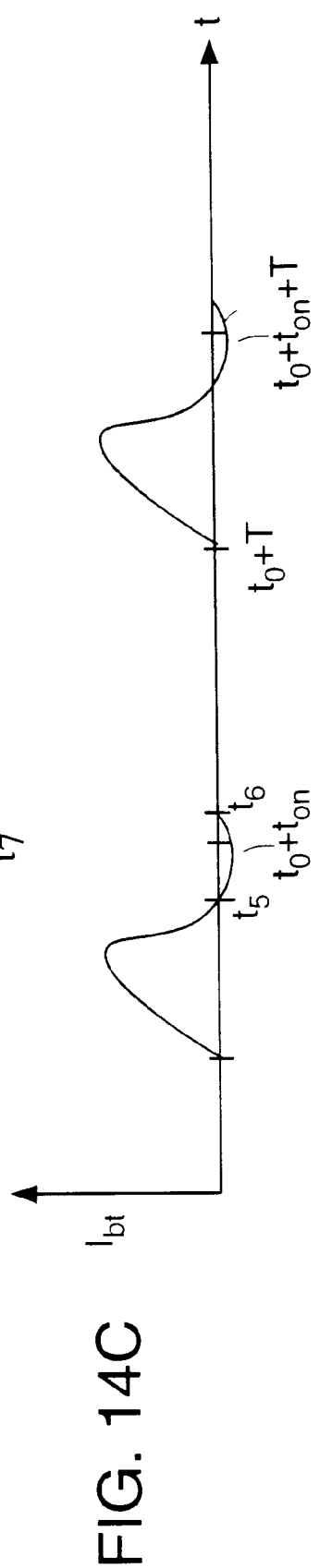

FIG. 12 shows a single-ended, isolated, power factor correcting AC-to-DC power conversion circuit 100. The converter 100 is similar to the converter 90 except that the diode 42 has been removed and a diode 102 has been connected in antiparallel with the switch 18 in a boost converter 104. The boost tank 50 is tuned to allow the boost tank current $I_{bt}$ to flow in both directions through the boost tank inductor 54. The boost converter 104 can thus run in long cycle mode, which allows design flexibility to achieve a desired bulk capacitor voltage $V_b$ by adjusting the boost tank resonant frequency $f_{50}$ and the buck tank resonant frequency $f_{30}$. The buck converter 16 operates in short cycle mode. The boost and buck portions of the converter 100 both operate in CCM.

Operation of the converter 100 will be explained with reference to FIGS. 13A–13D. The operation of the converter 100 is similar to the operation of the converter 90 shown in FIG. 5, except that the boost tank current $I_{bt}$ in the converter 100 drops below zero.

FIGS. 13A–13D show the timing of the switch 18, the boost inductor current $I_{bt}$, a boost capacitor voltage $V_{54}$ across the boost capacitor 54, and the boost inductor current $I_1$. The boost tank current $I_{bt}$ rises and falls essentially sinusoidally. When the boost tank current $I_{bt}$ equals the boost inductor current $I_1$, the boost capacitor 54 begins discharging, decreasing the boost capacitor voltage $V_{54}$ from the bulk capacitor voltage $V_b$. The boost tank 50 drives the boost tank current $I_{bt}$ to zero at time $t_5$. The boost tank current $I_{bt}$ is allowed to drop below zero, conducting through the diode 102 and removing energy from the boost inductor 32 until the boost tank current $I_{2bt}$ returns to zero at a time $t_6$ when the boost capacitor voltage $V_{54}$, which began charging just before time $t_5$, returns to the bulk capacitor voltage $V_b$ and the diode 102 ceases conducting. After the switch 18 turns off, energy is transferred from the boost inductor 32 to the bulk capacitor 20 as described above. FIG. 13D shows that the boost inductor current $I_1$ in the converter 100 is similar to the current in the converter 90 (FIG. 6C) except that the boost inductor current $I_1$ in the converter 100 decreases nonlinearly when the boost tank current $I_{bt}$ is negative.

The switch 18 in the converter 100 is preferably shut off after both the boost tank current $I_{bt}$ and the transfer current $I_{ft}$ are driven to zero. FIGS. 14A–14C and FIGS. 15A–15C show that a time $t_7$ when the transfer current $I_{ft}$ is driven to zero can be different than the time $t_5$ when the boost tank current $I_{bt}$ is initially driven to zero. Thus, the switch 18 is preferably opened at or after the later of times $t_5$ and $t_7$. The switch 18 is also preferably turned off at or before time $t_6$ to prevent the boost tank current $I_{bt}$ from becoming positive again. Thus, the buck tank 30 and the boost tank 50 are designed such that the time $t_7$ occurs at or before the time $t_6$. FIGS. 14A–14C and FIGS. 15A–15C therefore show that the switch 18 is opened at about the later of times $t_5$ and $t_7$ but at or before time $t_6$.

A more detailed discussion of the operation of a ZCS boost converter in long cycle mode can be found in the '348 patent.

With the boost converter 104 in long cycle mode, the bulk capacitor voltage $V_b$ is influenced by the boost tank resonant frequency $f_{50}$ and the buck tank resonant frequency $f_{30}$. The bulk capacitor voltage $V_b$ can be expressed as:

$$V_b \cong V_{AC} + V_{Load} \frac{f_{30}}{f_{50}} * \frac{N_P}{N_S} \quad (2)$$

Thus, the boost tank resonant frequency $f_{50}$ and the buck tank resonant frequency $f_{30}$ can be selected to achieve a desired bulk capacitor voltage $V_b$ for a given load voltage $V_{Load}$ and AC source voltage $V_{AC}$.

TABLE 1 shows the bulk capacitor voltage swing for a load voltage $V_{Load}$ of 48V, a transformer turns ratio $N_P/N_S$ of 19:7, and an AC source voltage range of 120–360V peak.

TABLE 1

| $r_f$ ($f_{30}/f_{50}$) | $V_b$ (magnitude variation) | $V_b$ (relative variation) |
| --- | --- | --- |
| 0.5 | 185–425 | 2.3:1 |
| 0.75 | 218–458 | 2.1:1 |
| 1.0 | 250–490 | 1.96:1 |

As the ratio $r_f$ increases, the relative variation in the bulk capacitor voltage $V_b$ decreases. Thus, using a higher ratio $r_f$ of boost tank resonant frequency $f_{50}$ to buck tank resonant frequency $f_{30}$ allows the bulk capacitor 20 to be designed to operate over a smaller relative swing than if a lower ratio $r_f$ is used. The ratio $r_f$ may be made greater than 1:1 if the control circuit 34 is configured properly.

Figure 16:
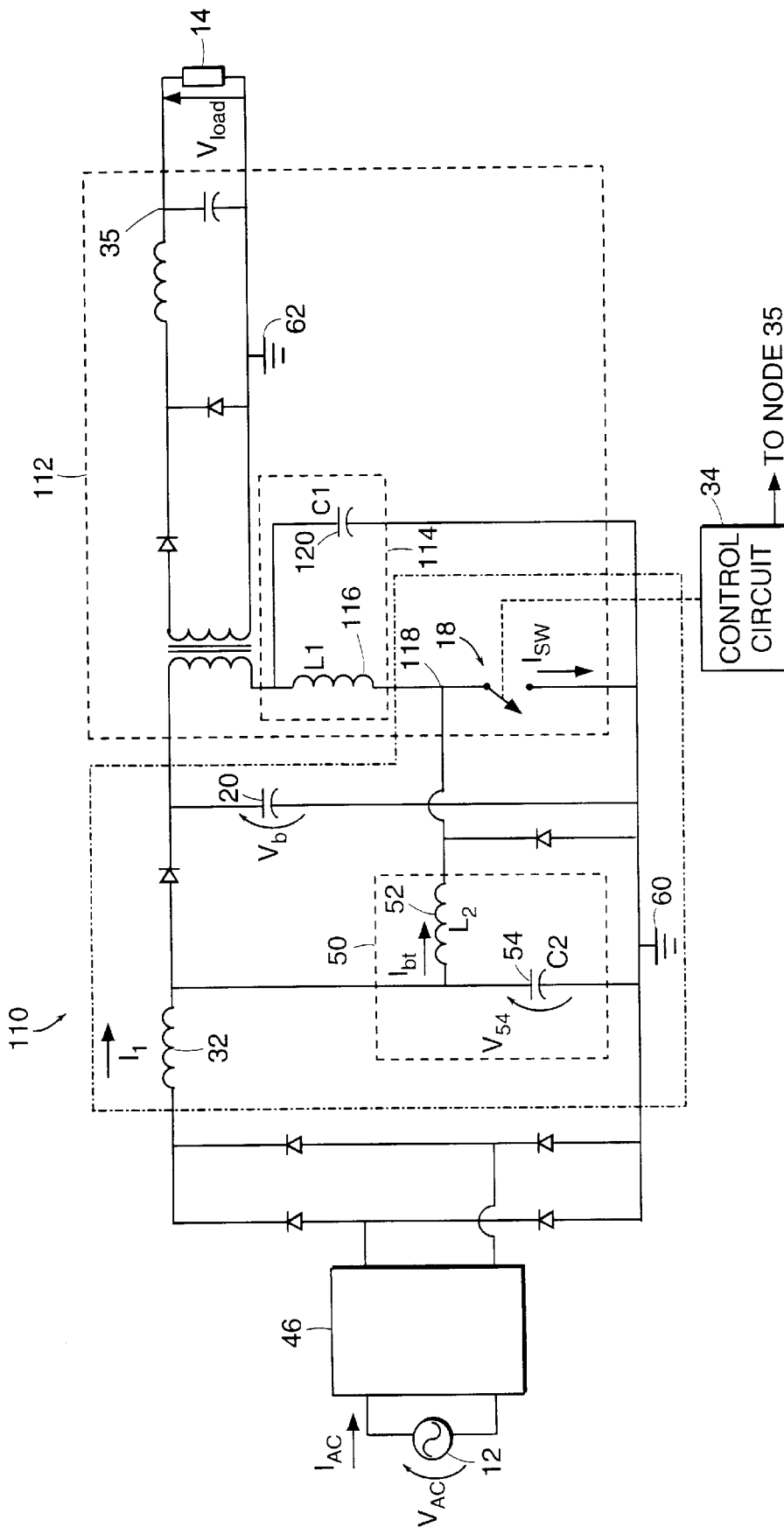
FIGS. 16–28 are diagrams of power conversion circuits.

The buck converter can also be run in long cycle mode. To do this, the buck tank capacitor inductor 24 and buck tank capacitor 28 are moved to the primary winding side of the transformer 26. FIG. 16 shows a converter 110 similar to the converter 100 shown in FIG. 12, except that the converter 110 has a buck converter 112 configured to run in long cycle mode. As shown, the buck converter 112 includes a buck tank 114 having a buck tank inductor 116 serially coupled between the primary winding 36 of the transformer 26 and a node 118, and a buck tank capacitor 120 coupled in parallel with the buck tank inductor 116 and the switch 18. Similar modifications can be made to the converters 10 and 90 shown in FIGS. 2 and 5, respectively, or the figures described below. Thus, each buck and boost converter (except boost converter 22 shown in FIG. 2) can be run in short or long cycle mode.

Figure 17:
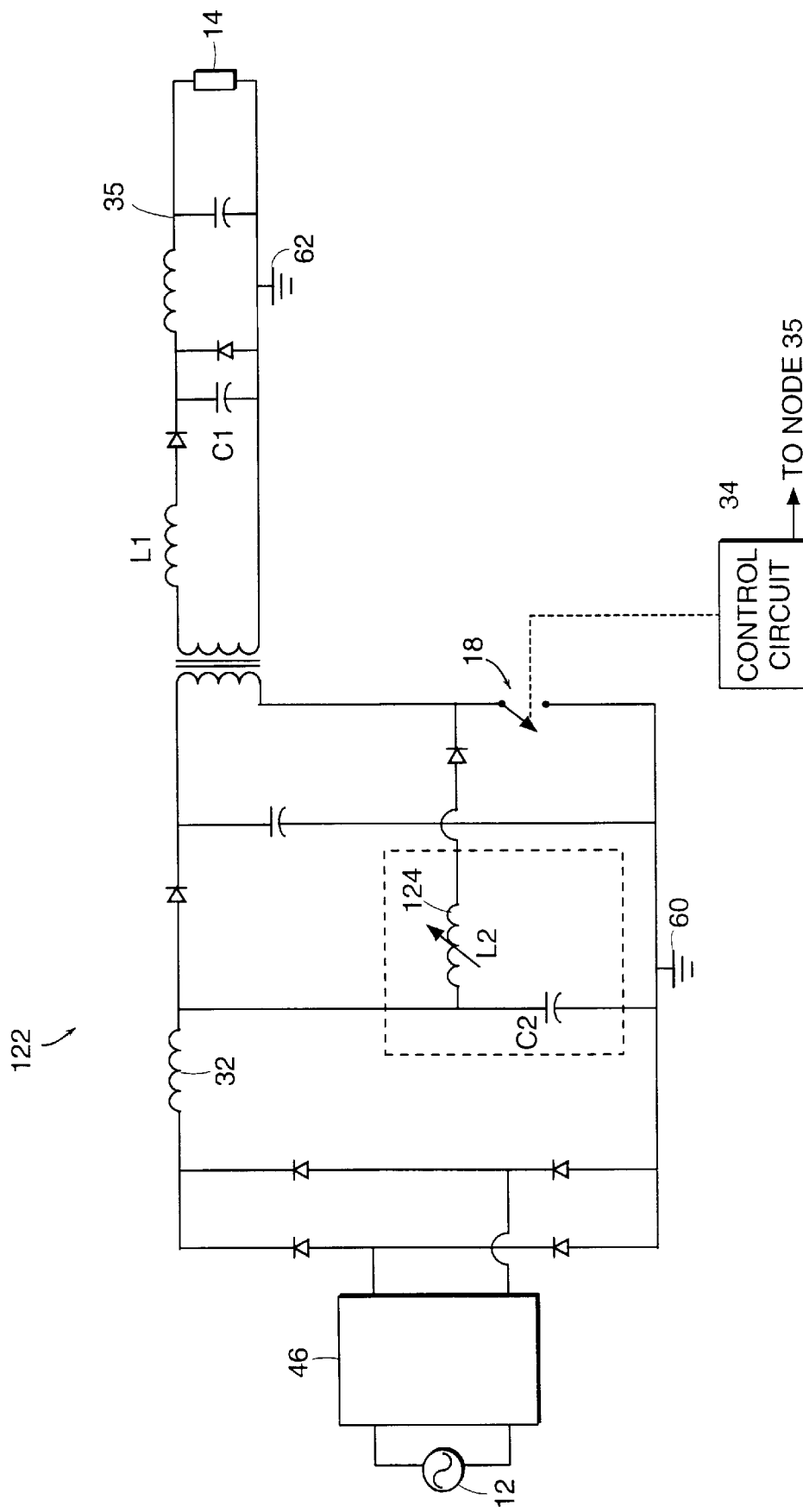

FIG. 17 shows a single-ended, isolated, power factor correcting AC-to-DC power conversion circuit 122 similar to the converter 90 shown in FIG. 5 except that a variable inductor 124 having an inductance $L_v$ has replaced boost tank inductor 52. As discussed, the value of the inductance $L_v$ affects the bulk capacitor voltage $V_b$. The inductance $L_v$ can be controlled passively (open loop) or actively (closed loop) to improve PFC and/or achieve a desired bulk capacitor voltage $V_b$. For example, the variable inductor 124 can be a gapped E-core structure that varies directly or inversely proportional to the AC source current $I_{AC}$ or the AC source voltage $V_{AC}$ to run open loop. Alternatively, the variable inductor 124 can be controlled closed loop to vary as a mathematical function of, e.g., the source voltage (i.e., a squared function), or the bulk capacitor voltage $V_b$.

Figure 18:
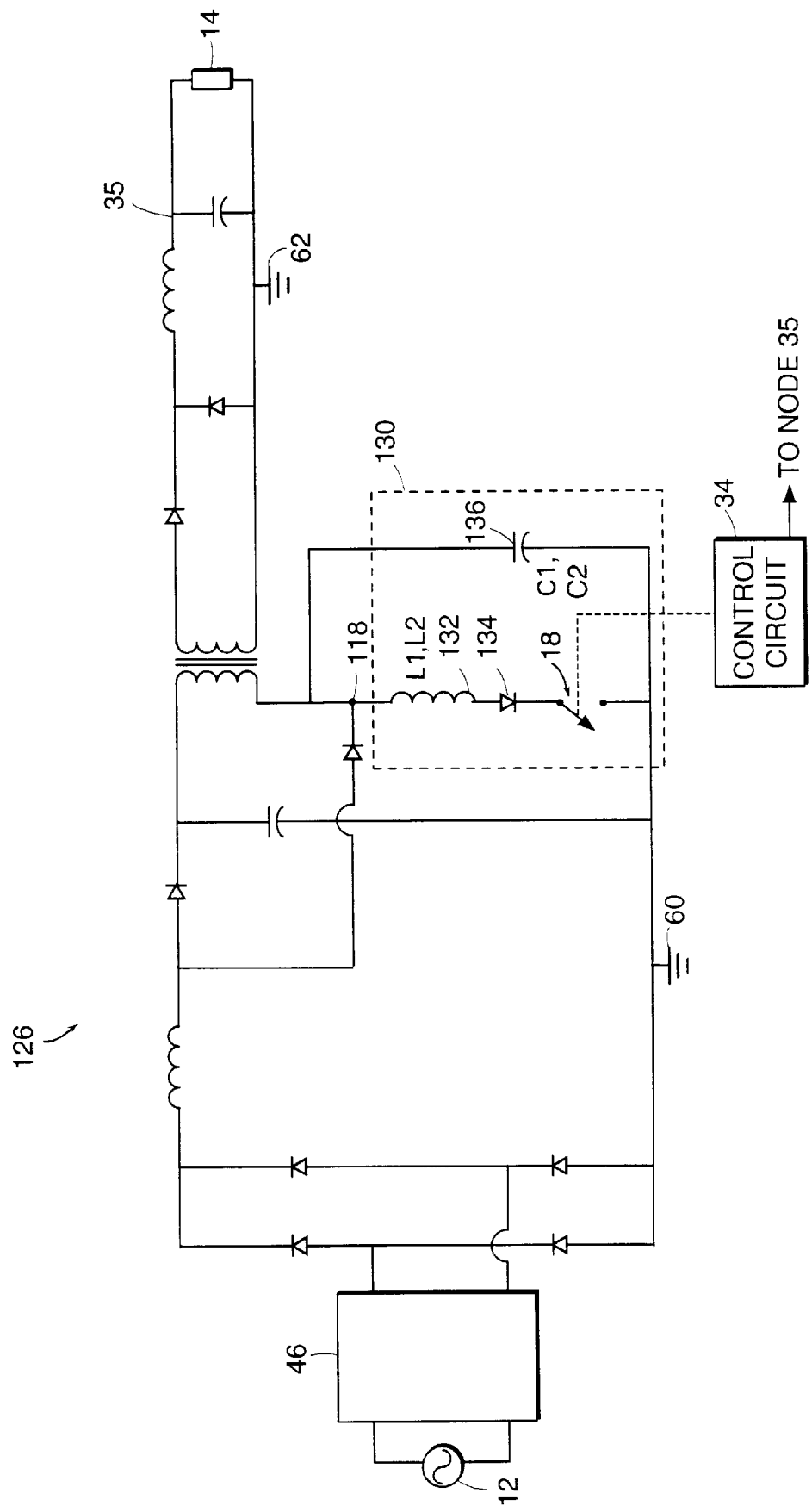
Figure 19:
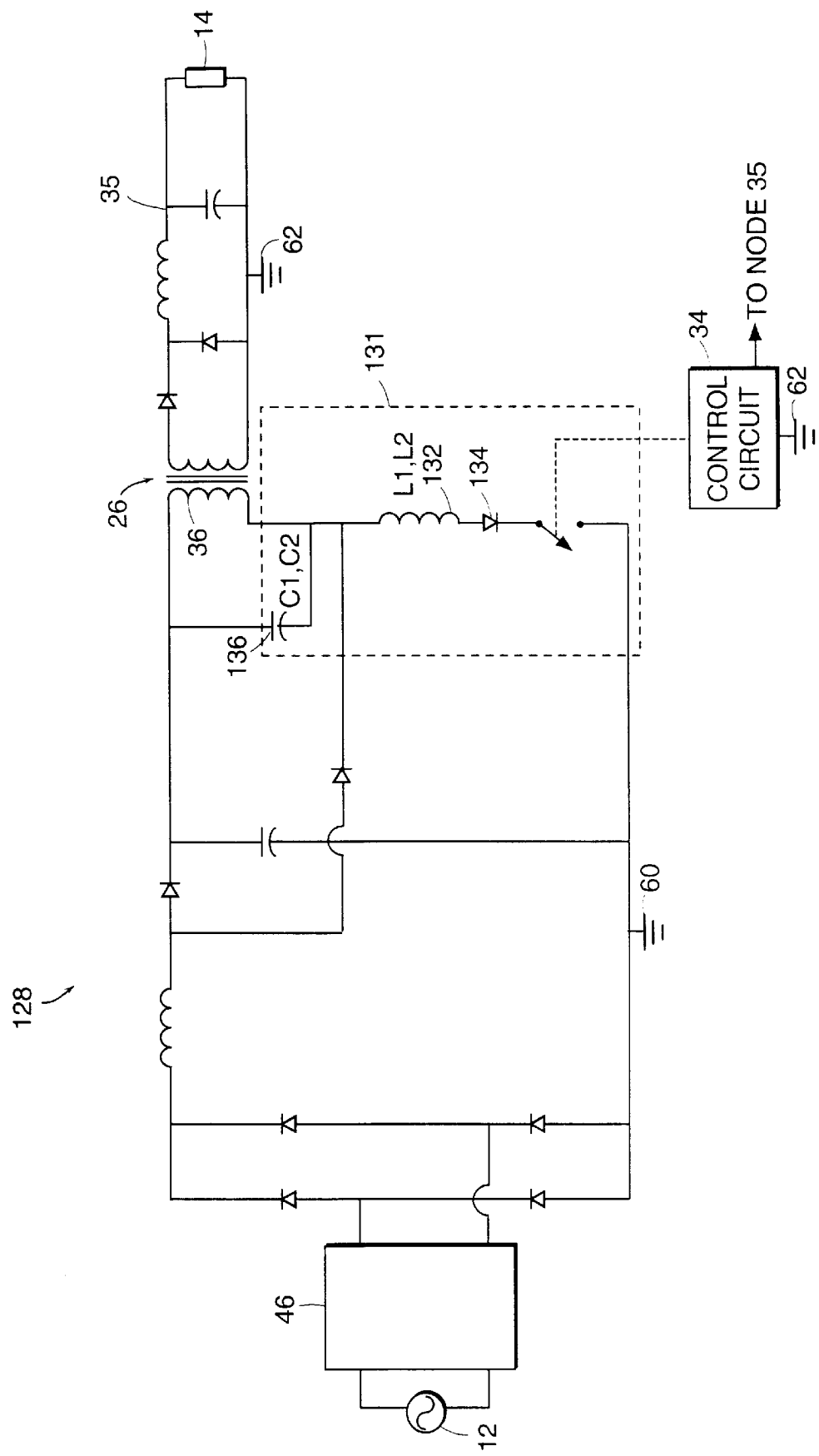

FIGS. 18–19 show two single-ended, isolated, power factor correcting AC-to-DC power conversion circuits 126 and 128 with combined boost and buck tanks. The converters 126 and 128 have combined boost/buck tanks 130 and 131 including a tank inductor 132, a diode 134, and a tank capacitor 136. In both tanks 130 and 131, the tank inductor 132, diode 134, and the switch 18 are serially coupled, with the anode and cathode of the diode 134 being coupled to the tank inductor 132 and the switch 18, respectively. In the tank 130, the tank capacitor 136 is coupled in parallel with the serially coupled tank inductor 132, diode 134, and switch 18. In the tank 131, the tank capacitor 136 is coupled in parallel with the primary winding 36 of the transformer 26. The boost/buck tanks 130 and 131 preferably have a resonant impedance equal to the parallel combination of the boost tank 50 and the buck tank 30 shown in FIG. 4. The tank inductor 132 can be a variable inductor.

FIGS. 20–23 show examples of compound single-ended, isolated, power factor correcting AC-to-DC power conversion circuits 140, 142, 144, and 146. Each of these converters comprises two boost-buck converters operating in parallel to realize a reduction in the number of semiconductors in current carrying paths compared with non-compound AC-to-DC power conversion circuits.

Figure 20:
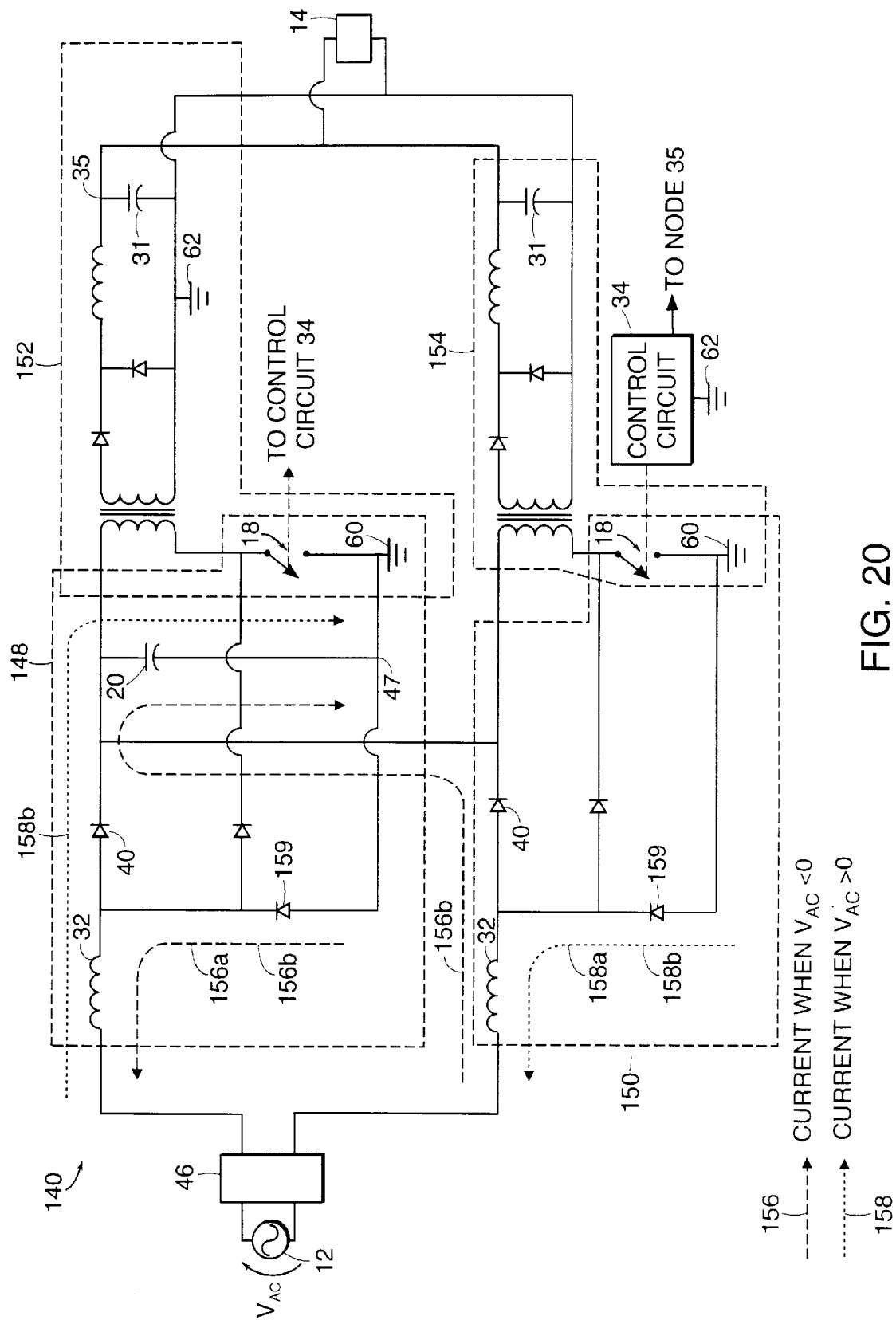

FIG. 20 shows that the compound converter 140 includes two parallel-connected boost converters 148 and 150, and two parallel-connected buck converters 152 and 154. Preferably, the boost converters 148 and 150 run in DCM and the buck converters 152 and 154 run in CCM and are Pulse Width Modulated (PWM) converters. The boost converter 148 is similar to boost converter 22 shown in FIG. 2 except that a diode 159 has its anode coupled to the node 47 and its cathode connected to boost inductor 32. The boost converter 150 is similar to the boost converter 148 without the bulk capacitor 20. The boost converters 148 and 150 are coupled in parallel between the cathodes of diodes 40 and ground 60, and are coupled through their boost inductors 32 and through the filter 46 to opposing polarities of the AC source 12. The output capacitors 31 of the buck converters 152 and 154 are connected in parallel.

The compound converter 140 reduces loss compared to non-compound converters. The non-compound converter 10 shown in FIG. 2 has two diodes in the current path during the entire cycle of the AC source 12 (e.g., diodes 98 and 99 during the positive half cycle of the AC source 12). A relatively large boost input current in the compound converter 140, as shown by arrow 156a, flows through only one diode, diode 159 of the boost converter 148, when the AC source voltage $V_{AC}$ is less than zero and the switch 18 of the converter 150 is on/closed. A relatively small boost output current, as shown by arrows 156b, flows through two diodes, diode 159 of the boost converter 148 and diode 40 of the boost converter 150, when the AC source voltage $V_{AC}$ is less than zero and the switch 18 of the boost converter 150 is off/open. Thus, the average current, which is dominated by the boost input current, effectively only flows through one diode. A similar effect occurs when the AC source voltage is greater than zero as shown by arrows 158a and 158b. A reduction in the number of diodes in the high-current path reduces losses in the converter 140 as more fully described in Vinciarelli, U.S. Pat. No. 5,572,417, "AC to DC Boost Power Converters," assigned to the assignee of this application and incorporated herein by reference. When the compound converter 140 is used for high power applications, the reduced losses increase efficiency enough to compensate for the added complexity compared to non-compound converters.

Figure 21:
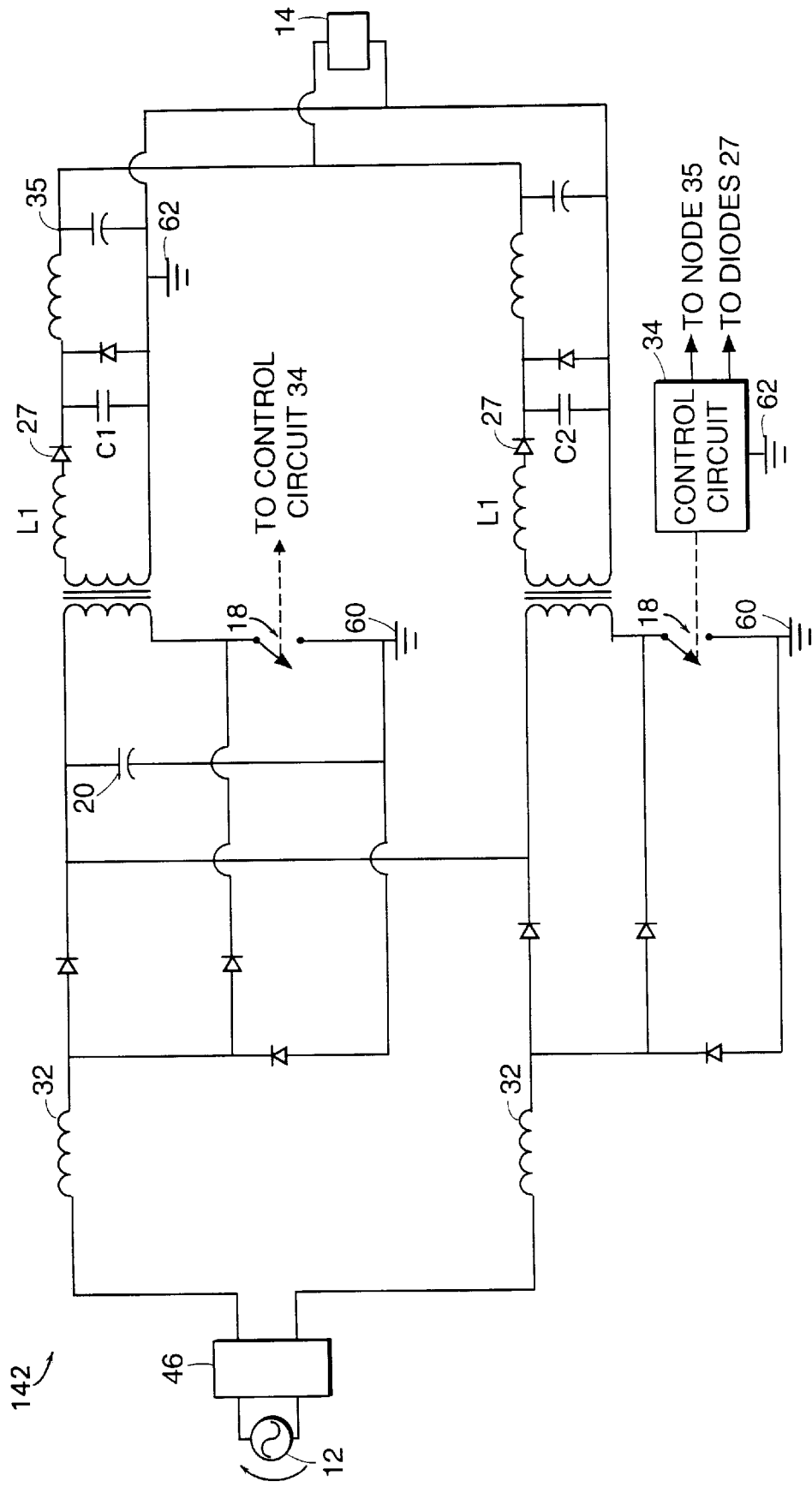
Figure 22:
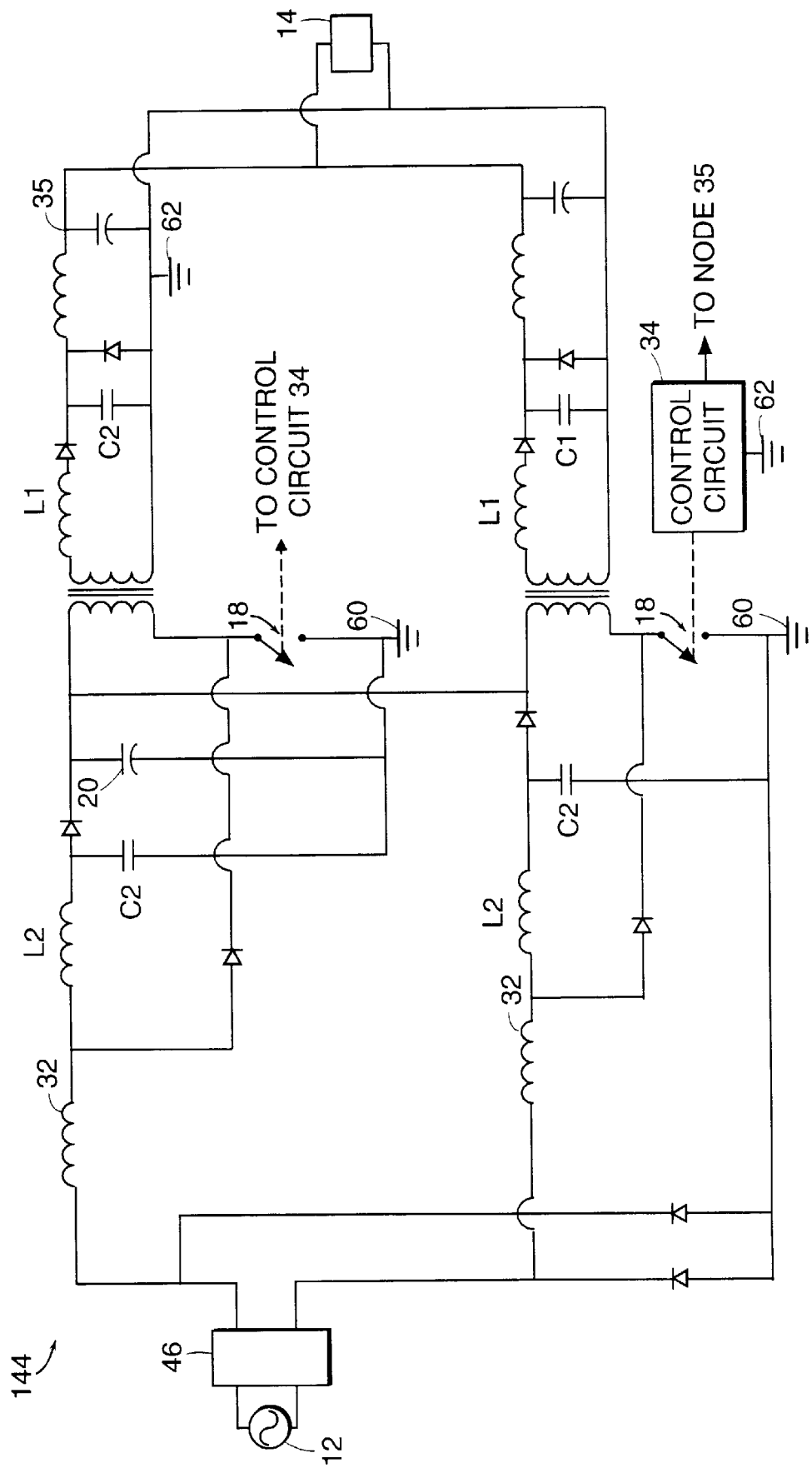
Figure 23:
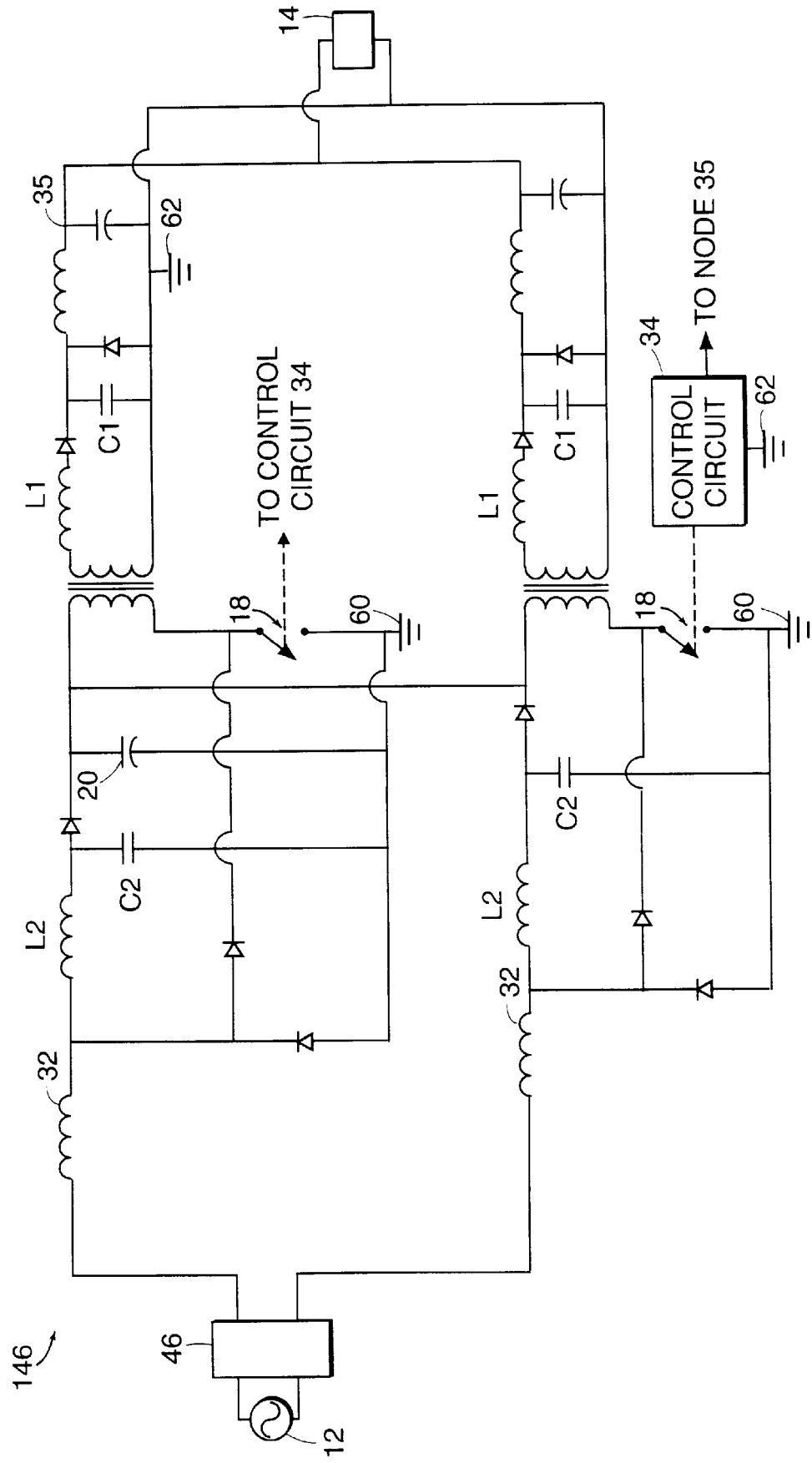

FIGS. 21–23 show other compound converters. The converter 142 shown in FIG. 21 is essentially two of the converters 10 shown in FIG. 2 operated in parallel. The converter 144 shown in FIG. 22 is essentially two of the converters 90 shown in FIG. 5 operated in parallel. The converter 146 shown in FIG. 23 is a parallel combination of two ZCS buck converters and two boost converters configured to operate in long cycle mode.

The converters 140, 142, 144 and 146 shown in FIGS. 20–23 have some common characteristics. For example, each of the boost converters conduct current through their respective boost inductors 32 during half of a cycle of the AC source 12 while the forward converters 16 run continuously to deliver energy from the bulk capacitor 20 to the load 14 during the entire cycle of the AC source 12. Additionally, the two buck converters deliver the same amount of power to the load 14 if they operate at the same frequency. To operate at the same frequency, the two switches 18 do not need to switch simultaneously, but should have about the same switching frequency controlled, e.g., by a single control circuit 34. If the control circuit 34 operates the buck converters 180° out of phase from each other, then the size of components in, and cost of, the input EMI filter 46 can be reduced.

One way to achieve power factor correction in the converters of FIGS. 2, 5, 12, 16, 18, 19, 22 and 23 is to operate the converters at a converter operating frequency that is essentially constant throughout each half-cycle of the AC source 12 but that is controlled (e.g., by the control circuit 34) to maintain the output voltage at some predetermined value. Because the current drawn from the converter is strongly dependent on the instantaneous value of the input voltage, a relatively constant operating frequency will yield an input current that closely follows the time-varying waveform of the input source.

Figure 24:
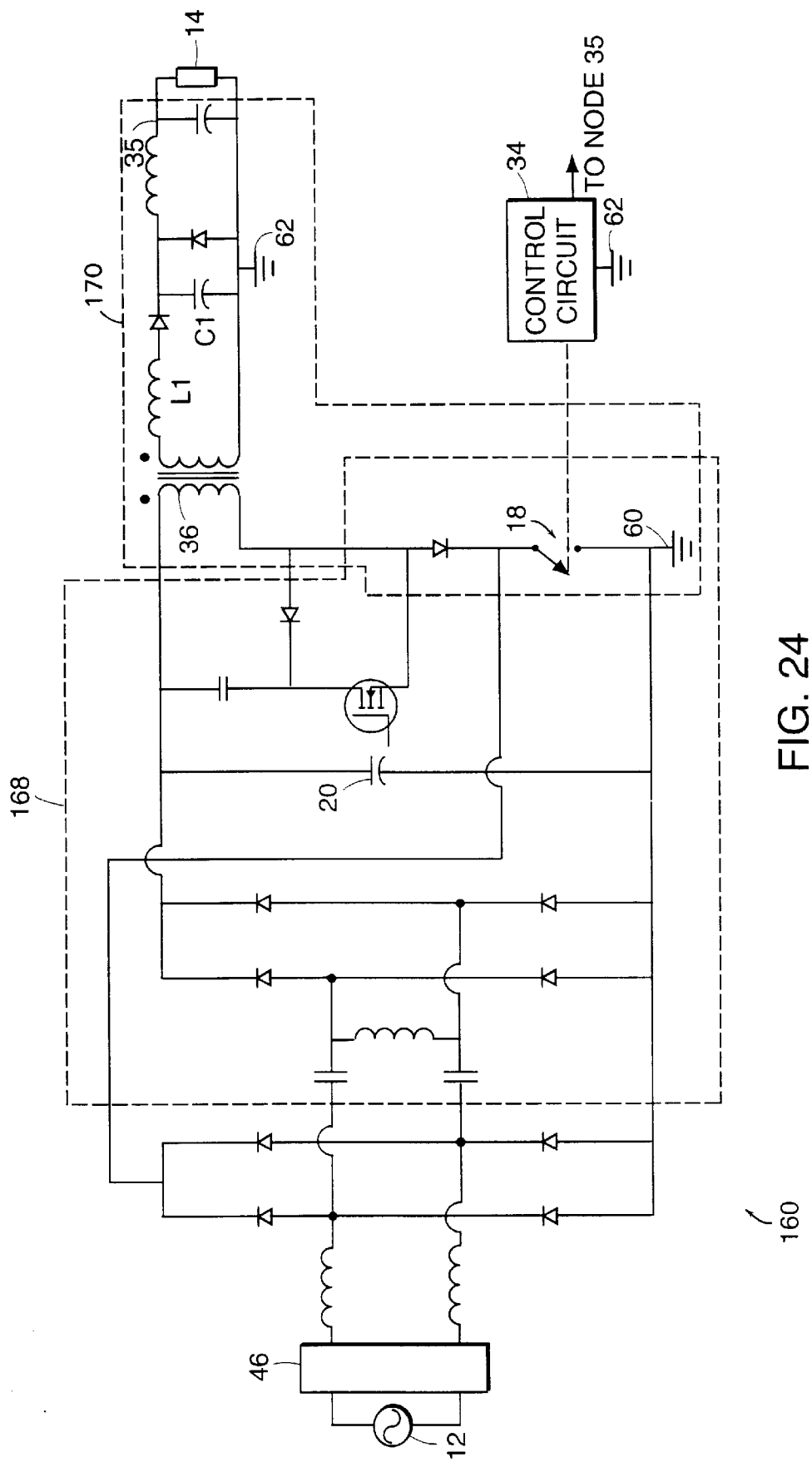
Figure 25:
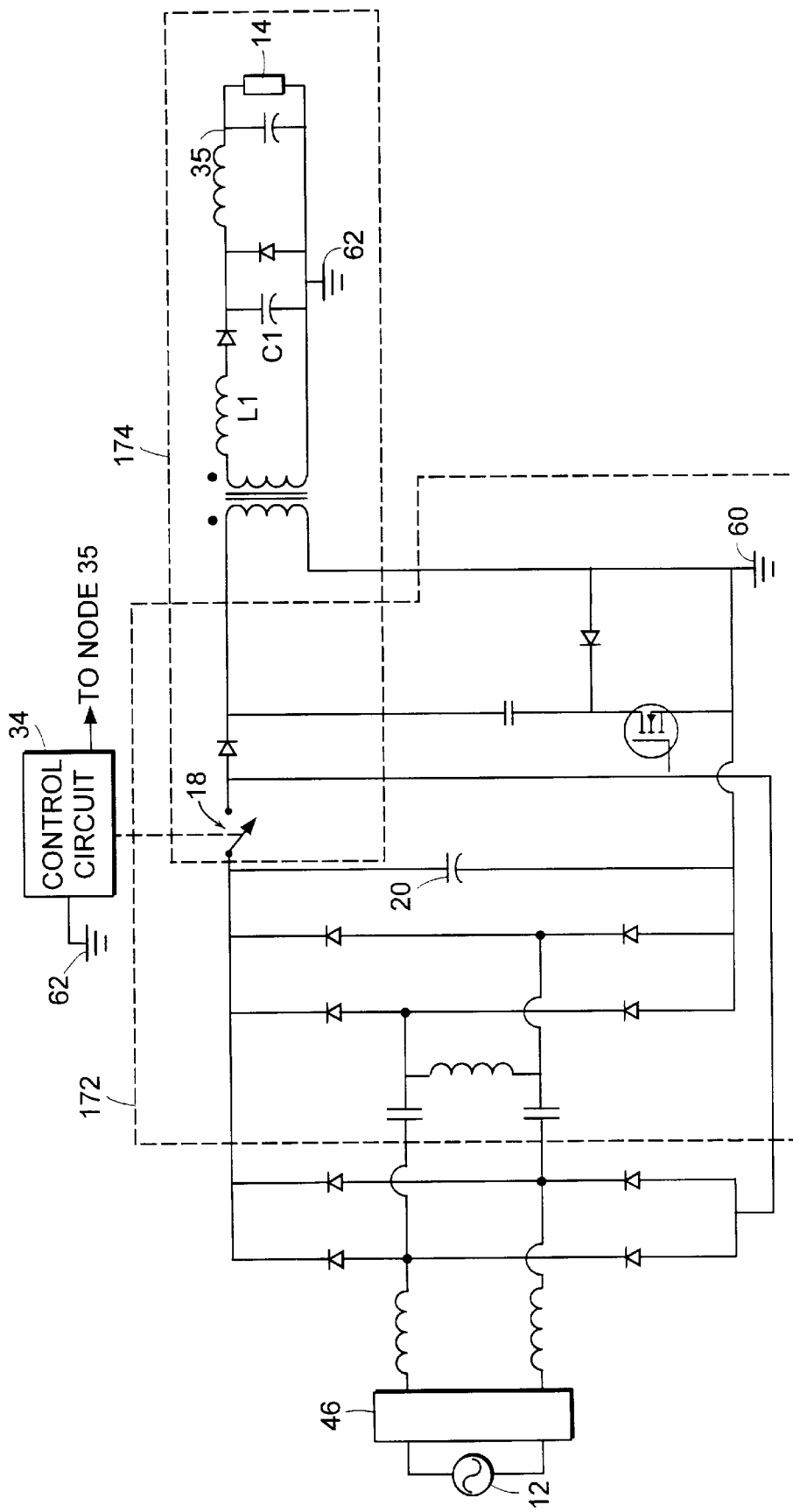
Figure 26:
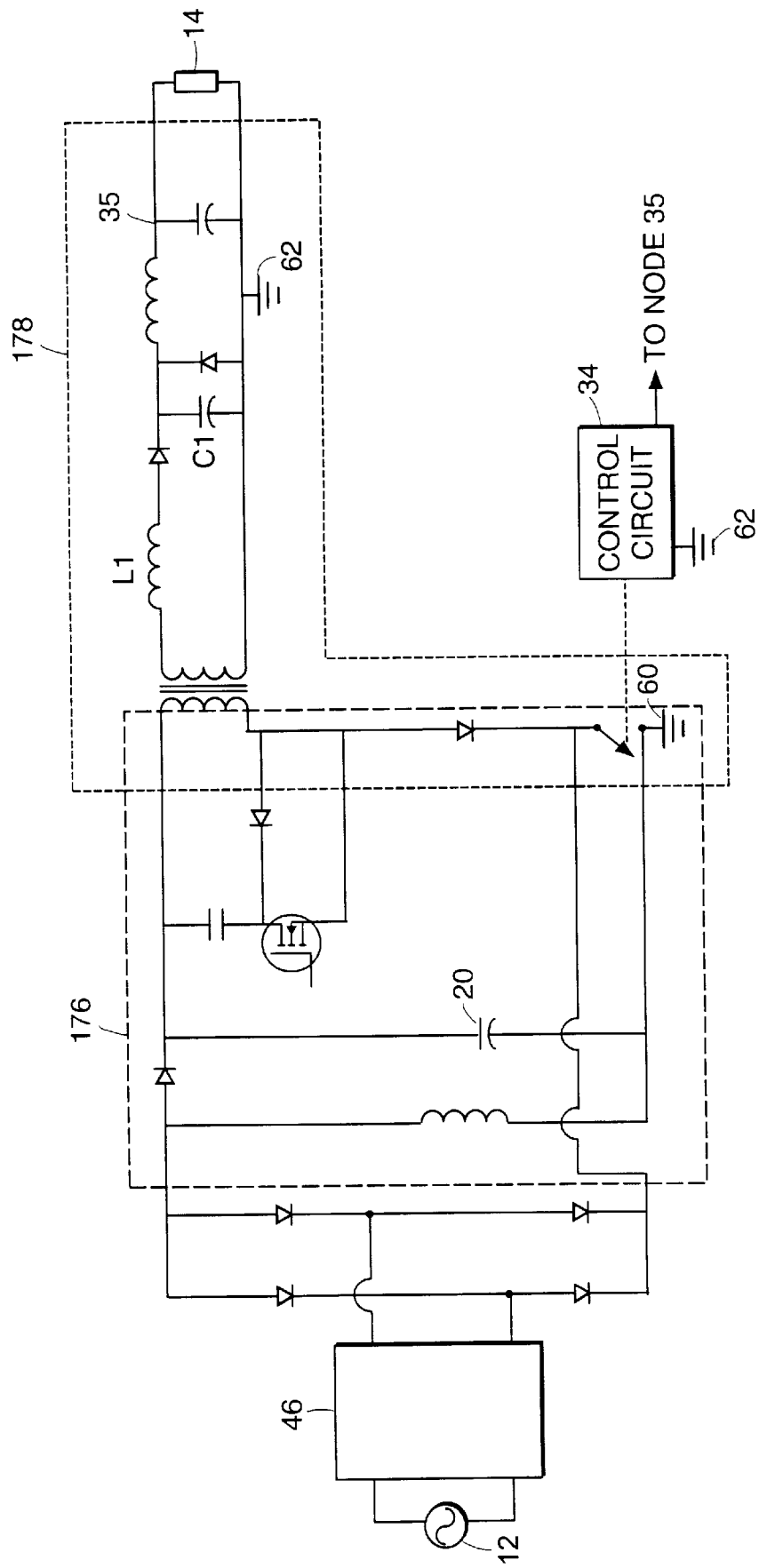
Figure 27:
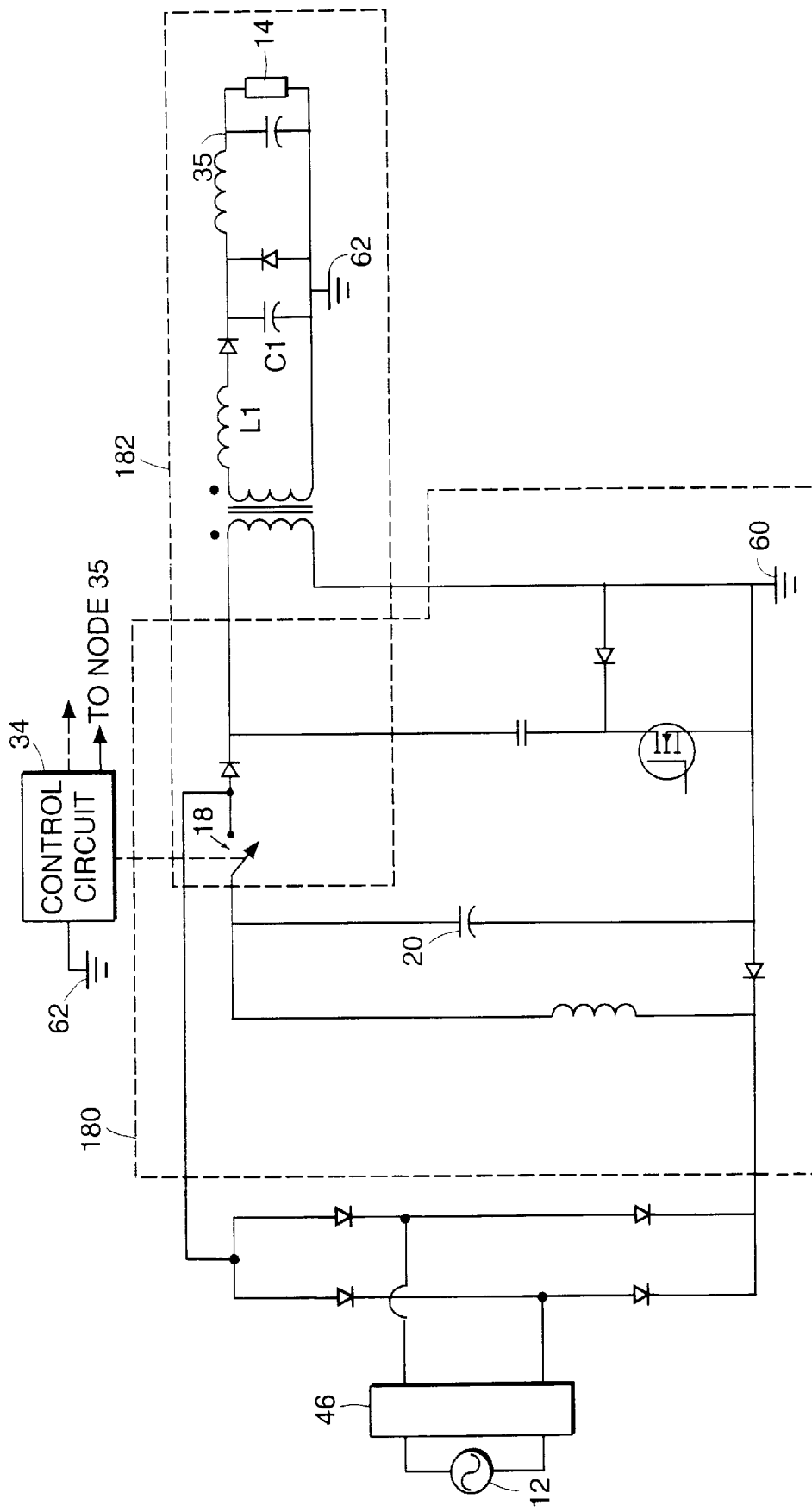

FIGS. 24–27 show several single-ended, isolated, power factor correcting AC-to-DC power conversion circuits 160, 162, 164, and 166, respectively, that do not use boost converters. FIG. 24 shows that converter 160 includes a DCM SEPIC converter 168 connected to a ZCS buck converter 170. The switch 18 is connected to the low-voltage side of the bulk capacitor 20. FIG. 25 shows that the converter 162 includes a DCM SEPIC converter 172 connected to a ZCS buck converter 174, with the switch 18 connected to the high-voltage side of the bulk capacitor 20. FIG. 26 shows that the converter 164 includes a DCM flyback converter 176 connected to a ZCS buck converter 178, with the switch 18 connected to the low-voltage side of the bulk capacitor 20. FIG. 27 shows that the converter 166 includes a DCM flyback converter 180 connected to a ZCS buck converter 182, with the switch 18 connected to the high-voltage side of the bulk capacitor 20.

Figure 28:
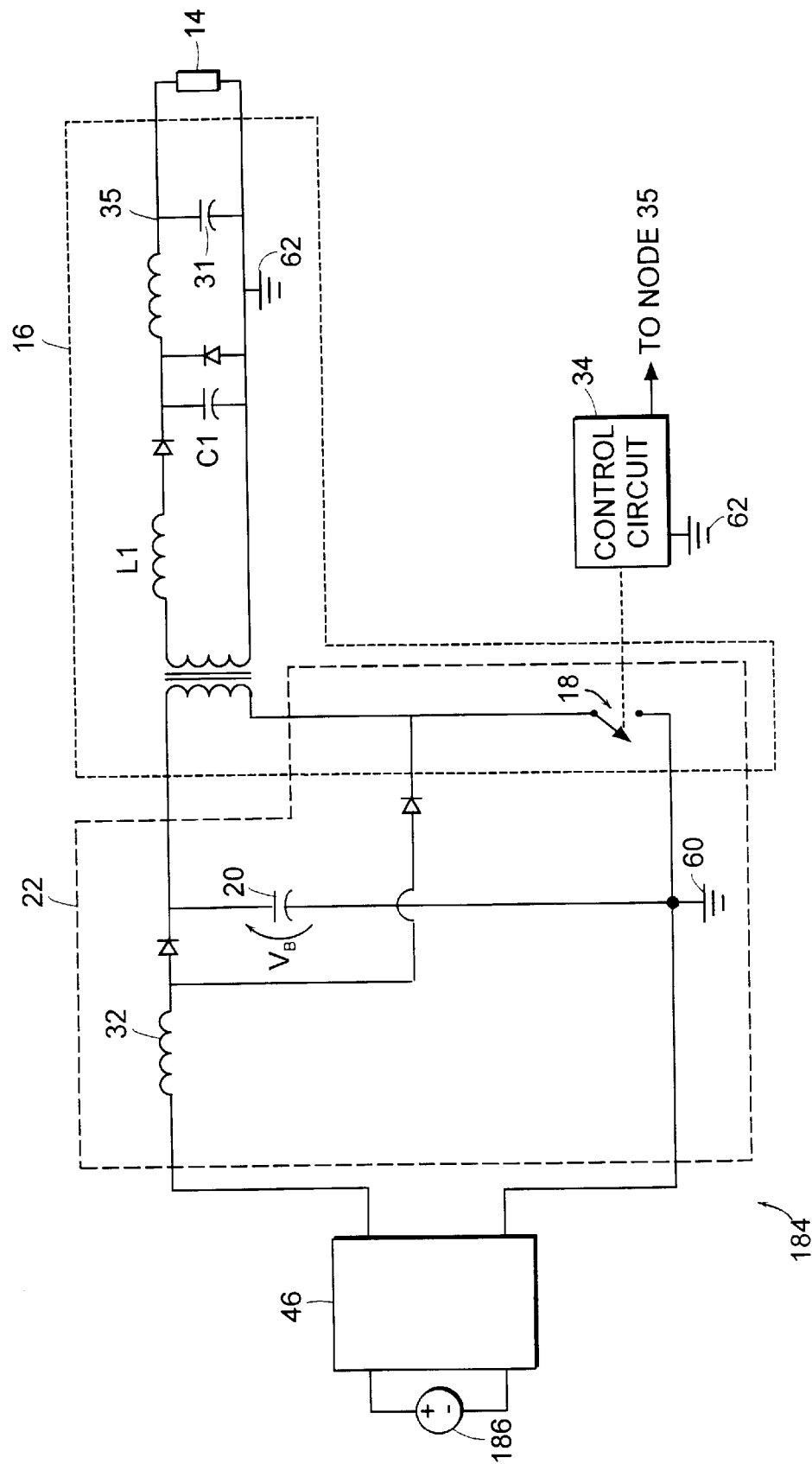

FIG. 28 shows a single-ended, isolated, power factor correcting DC-to-DC power conversion circuit 184. A DC source 186 is coupled through the filter 46 to the boost converter 22 and the buck converter 16 shown in FIG. 2. The control circuit 34 is coupled to the switch 18 and to the output capacitor 31. The DC source 186 supplies energy to the bulk capacitor 20 in packets. The peaks of the current in the boost inductor 32, which runs in DCM, are proportional to an instantaneous voltage $V_{DC}$ of the DC source 186. The boost inductor 32 can run in CCM by adding an input tank to the boost converter 22, similar to the converter 90 shown in FIG. 5, to further control the delivery of energy packets to the bulk capacitor 20.

The switching frequency is adjusted to regulate the delivery of energy packets to the load 14 so that the bulk capacitor voltage $V_b$ remains substantially constant for changing loads, and so that the bulk capacitor voltage $V_b$ has a relative swing lower than corresponding relative swings of the DC source voltage $V_{DC}$.

Other embodiments are within the scope of the following claims. For example, although many power converters have been described with respect to AC-to-DC power conversion, these power converters can provide beneficial features for DC-to-DC power factor correcting applications. Any of the non-compound converters can reduce the range of variation in the bulk capacitor voltage $V_b$ relative to the range of variation in DC input voltage and would not require an input rectifier (e.g., rectifier 45 shown in FIG. 2). Additionally, the compound converters will operate as illustrated and described above when connected to a DC input source in any polarity.

What is claimed is:

1. A power converter, for accepting power from a source and delivering power to a load, comprising:
    conversion circuitry including a first side coupled to the source and a second side isolated from the first side and coupled to the load;

energy storage circuitry, connected to the first side of the conversion circuitry, for storing energy at a voltage higher than the voltage of the source; and a switch arranged with respect to the conversion circuitry and energy storage circuitry to allow energy to be delivered from the source to the energy storage circuitry and a quantum of energy to be delivered to the second side of the conversion circuitry during a time that the switch is closed wherein the quantum of energy has a characteristic time constant $T_c$ defined by an inductance L and a capacitance C such that $T_c = \pi^* \text{sqrt}(LC)$.

2. The power converter of claim 1 wherein the conversion circuitry is adapted to deliver a DC output voltage to the load, the power converter further comprising a controller for regulating opening and closing of the switch to maintain the DC output voltage at a predetermined value.

3. The power converter of claim 2 wherein the controller is adapted to alter a switching frequency of the switch.

4. The power converter of claim 2 wherein the controller opens the switch when there is substantially no current flowing through the switch.

5. The power converter of claim 4 wherein the controller controls the switch to operate at least one of the energy storage circuitry and the conversion circuitry in a short cycle mode.

6. The power converter of claim 4 wherein the controller controls the switch to operate at least one of the energy storage circuitry and the conversion circuitry in a long cycle mode.

7. The power converter of claim 1 wherein the inductance L and the capacitance C are connected to the first side of the conversion circuitry.

8. The power converter of claim 1 wherein the inductance L and the capacitance C are connected to the second side of the conversion circuitry.

9. The power converter of claim 1 wherein at least a portion of the inductance L is a leakage inductance of a transformer.

10. The power converter of claim 1 wherein the conversion circuitry comprises a transformer providing the first and second isolated sides.

11. The power converter of claim 1 wherein the energy storage circuitry includes a boost inductive element and a bulk capacitor arranged to allow energy to be transferred from the boost inductive element to the bulk capacitor during a time that the switch is open.

12. The power converter of claim 1 wherein the energy storage circuitry is adapted to receive energy from a DC voltage source and the conversion circuitry is adapted to deliver a DC voltage to the load.

13. The power converter of claim 1 wherein the energy storage circuitry is adapted to receive energy from an AC voltage source and the conversion circuitry is adapted to deliver a DC voltage to the load.

14. The power converter of claim 13 wherein the energy storage circuitry includes a rectifier coupled to the AC voltage source.

15. The power converter of claim 13 wherein the energy storage circuitry is arranged such that a current delivered from the source to the energy storage circuitry is substantially proportional to an instantaneous voltage level of the source.

16. The power converter of claim 13 further comprising a controller for regulating times at which the switch is opened and closed to maintain the DC output voltage at a predetermined value.

17. The power converter of claim 16 wherein the controller is adapted to maintain a switching frequency of the switch essentially constant throughout each half-cycle of the AC source.

18. The power converter of claim 1 wherein the energy storage circuitry comprises a boost circuit.

19. The power converter of claim 1 wherein the energy storage circuitry comprises a SEPIC converter.

20. The power converter of claim 1 wherein the energy storage circuitry comprises a flyback converter.

21. The power converter of claim 1 wherein the energy storage circuitry is arranged such that a current delivered from the source to the energy storage circuitry is substantially proportional to an instantaneous voltage level of the source.

22. A method for use in converting power from a source to a load, the method comprising:

closing a switch;

receiving energy from the source during at least a portion of the time that the switch is closed for storage in a first circuit at a voltage higher than the voltage of the source; and transferring, during at least a portion of the time that the switch is closed, a quantum of energy stored in the first circuit to a second circuit that is coupled to the load and is isolated from the first circuit;

wherein the quantum of energy has a characteristic time constant $T_c$ defined by an inductance L and a capacitance C such that $T_c = \pi^* \text{sqrt}(LC)$.

23. The method of claim 22 wherein the switch is opened when substantially no current is flowing through the switch.

24. The method of claim 22 wherein the switch is opened and closed such that a DC output voltage supplied to the load is substantially maintained at a predetermined value.

25. The method of claim 22 wherein the second circuit operates in a continuous conduction mode.

26. The method of claim 22 comprising opening and closing the switch such that at least one of the first and second circuits operates in a short cycle mode.

27. The method of claim 22 comprising opening and closing the switch such that at least one of the first and second circuits operates in a long cycle mode.

28. A method of operating an AC-to-DC power conversion circuit that accepts energy from an AC input source and delivers energy to a load at a DC output voltage so that a time-varying waveform of an input current drawn from the AC input source is substantially in phase with a time varying waveform of a voltage delivered by the AC input source, the method comprising:

providing a first circuit configured to receive energy from the AC input source during at least a portion of the time that a switch is closed and to store received energy at a voltage higher than the voltage of the AC input source, an instantaneous current received from the AC input source being substantially proportional to an instantaneous voltage of the AC input source;

providing a second circuit that is configured to couple a quantum of stored energy, during at least a portion of the time that the switch is closed, from the first circuit to the load and that is isolated from the AC input sources, wherein the quantum of energy has a characteristic time constant $T_c$ defined by an inductance L and a capacitance C such that $T_c = \pi^* \text{sqrt}(LC)$; and controlling a frequency at which the switch is opened and closed to maintain the DC output voltage substantially at a predetermined value, the frequency being essentially constant throughout a half-cycle of the AC input source.

29. An isolated, power factor correcting power converter, for accepting power from an AC source and delivering DC power to a load, comprising:
 a boost circuit, coupled to the AC source through an input filter and a rectifier, for storing energy received from the AC source at a voltage higher than the voltage of the AC source in a bulk storage element;
 a transformer including a primary winding and a secondary winding isolated from the primary winding, the primary winding being coupled to the bulk storage element;
 an output circuit coupled to the secondary winding of the transformer and coupled to the load;
 a switch coupled to the boost circuit and to the primary winding; and
 a controller coupled to the switch and responsive to a voltage at the load to open and close the switch;
 wherein energy is delivered from the source to the boost circuit and a quantum of energy is delivered to the secondary winding during a time that the switch is closed by the controller,
 wherein the quantum of energy has a characteristic time constant $T_c$ defined by an inductance L and a capacitance C such that $T_c = \pi \ast \text{sqrt}(LC)$.

30. The power converter of claim 29 wherein the output circuit comprises a buck circuit including a buck tank inductor and a buck tank capacitor connected in series with the secondary winding.

31. The power converter of claim 30 wherein the boost circuit comprises a boost tank inductor, a boost tank capacitor, and a unidirectional conduction device connected in series with the switch, and is configured to operate in short cycle mode.

32. The power converter of claim 30 wherein the boost circuit comprises a boost tank inductor and a boost tank capacitor connected in series with the switch, and a unidirectional conduction device connected in parallel with the switch, the boost circuit being configured to operate in long cycle mode.

33. The power converter of claim 29 wherein the boost circuit comprises a boost tank inductor and a boost tank capacitor connected in series with the switch, and a unidirectional conduction device connected in parallel with the switch, the boost circuit being configured to operate in long cycle mode, the power converter further comprising a buck tank including a buck tank inductor coupled in series between the primary winding and the switch, and a buck tank capacitor connected in parallel with the buck tank inductor and the switch, the buck tank configured to operate in long cycle mode.

34. The power converter of claim 29 wherein the boost circuit comprises a combined boost-buck tank including a boost-buck tank inductor and a unidirectional conduction device connected in series between the primary winding and the switch, the unidirectional conduction device permitting current flow from the primary winding toward the switch, the boost-buck tank further including a boost-buck tank capacitor connected in parallel with the boost-buck tank inductor, the unidirectional conduction device, and the switch.

35. The power converter of claim 29 wherein the boost circuit comprises a combined boost-buck tank including a boost-buck tank inductor and a unidirectional conduction device connected in series between the primary winding and the switch, the unidirectional conduction device permitting current flow from the primary winding toward the switch, the boost-buck tank further including a boost-buck tank capacitor connected in parallel with the primary winding.

36. The power converter of claim 29 wherein the boost circuit comprises a boost tank capacitor, and a boost tank inductor having a controllable inductance.

37. The converter of claim 31 wherein a value of the boost tank inductor, $L_b$, and a value of the boost tank capacitor, $C_b$, define a characteristic time constant $T_b = \pi \ast \text{sqrt}(L_b C_b)$ for the receiving of energy quanta from the AC source.

38. The converter of claim 32 wherein a value of the boost tank inductor, $L_b$, and a value of the boost tank capacitor, $C_b$, define a characteristic time constant $T_b = \pi \ast \text{sqrt}(L_b C_b)$ for the receiving of energy quanta from the AC source.

* * * * *